United States Patent
Lee et al.

(10) Patent No.: US 11,087,306 B2
(45) Date of Patent: Aug. 10, 2021

(54) MOBILE TERMINAL AND METHOD FOR CONTROLLING THE SAME

(71) Applicant: LG ELECTRONICS INC., Seoul (KR)

(72) Inventors: Sukjin Lee, Seoul (KR); Dongsu Han, Seoul (KR); Chohee Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1213 days.

(21) Appl. No.: 15/098,076

(22) Filed: Apr. 13, 2016

(65) Prior Publication Data
US 2016/0328695 A1  Nov. 10, 2016

(30) Foreign Application Priority Data

May 4, 2015  (KR) .......................... 10-2015-0062669

(51) Int. Cl.
*G06Q 20/32* (2012.01)
*G06Q 20/38* (2012.01)
*G06Q 20/40* (2012.01)

(52) U.S. Cl.
CPC ....... *G06Q 20/3223* (2013.01); *G06Q 20/322* (2013.01); *G06Q 20/327* (2013.01); *G06Q 20/382* (2013.01); *G06Q 20/40* (2013.01)

(58) Field of Classification Search
CPC .............................................. G06Q 20/40145
USPC .......................................................... 705/44
See application file for complete search history.

(56) References Cited

U.S. PATENT DOCUMENTS

| | | | | |
|---|---|---|---|---|
| 9,122,340 B2* | 9/2015 | Jung | ................... | G06F 3/04883 |
| 10,147,076 B2* | 12/2018 | Zhou | ................... | G06Q 20/204 |
| 10,521,776 B2* | 12/2019 | Zhou | ................... | G06Q 20/4016 |
| 10,521,777 B2* | 12/2019 | Zhou | ................... | G06Q 20/326 |
| 2010/0082485 A1* | 4/2010 | Lin | .................... | G06Q 30/0603 |
| | | | | 705/44 |
| 2014/0047331 A1* | 2/2014 | Feldman | ............... | G06F 40/205 |
| | | | | 715/273 |
| 2014/0074637 A1* | 3/2014 | Hammad | ............. | G06Q 20/227 |
| | | | | 705/21 |
| 2014/0149198 A1* | 5/2014 | Kim | ................... | G06Q 30/0226 |
| | | | | 705/14.27 |
| 2014/0160010 A1* | 6/2014 | Jung | ................... | G06F 3/04883 |
| | | | | 345/156 |
| 2014/0244514 A1* | 8/2014 | Rodriguez | ......... | G06Q 20/3223 |
| | | | | 705/71 |

(Continued)

FOREIGN PATENT DOCUMENTS

| CN | 102436618 | 5/2012 |
|---|---|---|
| CN | 102956079 | 3/2013 |

(Continued)

OTHER PUBLICATIONS

Korean Intellectual Property Office Patent Application No. 10-2015-0062669, Office Action dated Feb. 4, 2016, 5 page.

(Continued)

*Primary Examiner* — Hani M Kazimi
*Assistant Examiner* — Paul R Kloberg
(74) *Attorney, Agent, or Firm* — Lee, Hong, Degerman, Kang & Waimey

(57) ABSTRACT

In a mobile terminal, while a payment mode in which payment is available to be performed by a payment unit, execution of a function other than the function related to the payment is limited.

20 Claims, 23 Drawing Sheets

(56) References Cited

U.S. PATENT DOCUMENTS

| | | | | |
|---|---|---|---|---|
| 2014/0258110 | A1* | 9/2014 | Davis | G06Q 30/0611 705/41 |
| 2015/0058146 | A1* | 2/2015 | Gaddam | G06Q 20/227 705/21 |
| 2015/0242844 | A1* | 8/2015 | Yisraelian | G06Q 20/40 705/41 |
| 2015/0296237 | A1* | 10/2015 | Numano | H04N 21/2543 725/5 |
| 2015/0310425 | A1* | 10/2015 | Cacioppo | G06Q 20/385 705/64 |
| 2016/0012465 | A1* | 1/2016 | Sharp | G06Q 20/386 705/14.17 |
| 2016/0253651 | A1* | 9/2016 | Park | G07F 9/023 705/39 |
| 2016/0253669 | A1* | 9/2016 | Yoon | G06Q 20/327 705/75 |
| 2016/0275471 | A1* | 9/2016 | Rajamannar | G06Q 20/3278 |
| 2017/0300893 | A1* | 10/2017 | Sasaki | G06F 3/0486 |
| 2019/0102756 | A1* | 4/2019 | Zhou | G06K 7/1413 |
| 2019/0325407 | A1* | 10/2019 | Zhou | G06Q 20/3829 |

FOREIGN PATENT DOCUMENTS

| | | |
|---|---|---|
| CN | 103632266 | 3/2014 |
| JP | 2010136415 A | 6/2010 |
| JP | 2014-123213 A | 7/2014 |
| JP | 2014123213 | 7/2014 |
| KR | 10-2013-0138659 A | 12/2013 |

OTHER PUBLICATIONS

Korean Intellectual Property Office Application No. 10-2015-0062669, Notice of Allowance dated Aug. 31, 2016, 5 pages.
European Patent Office Application No. 16154741.9, Search Report dated Sep. 7, 2016, 7 pages.
State Intellectual Property Office of the People's Republic of China Application Serial No. 201610186180.6, Office Action dated Jul. 29, 2020, 10 pages.

* cited by examiner

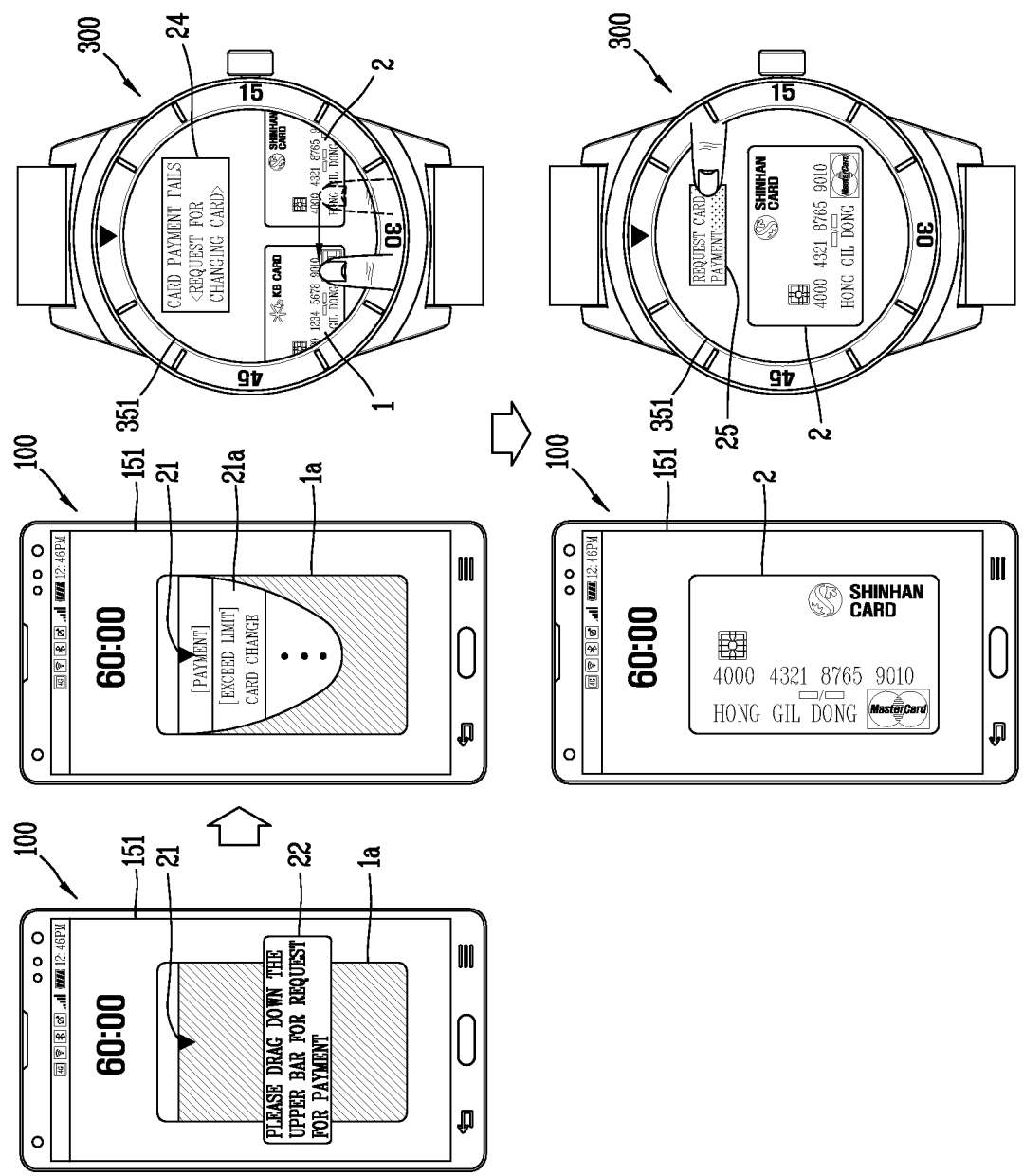

MOBILE TERMINAL AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2015-0062669, filed on May 4, 2015, the contents of which is incorporated by reference herein in its entirety.

BACKGROUND OF THE INVENTION

1. Field of the Invention

The present disclosure relates to a mobile terminal capable of performing a payment function and a method for controlling the same.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Meanwhile, as functions of mobile terminal have been diversified, interest in a mobile payment system in which information regarding a payment unit is registered in a mobile terminal and used for payment has increased. For example, in a case in which specific credit cared information is registered in a mobile terminal, a user of the mobile terminal may simply perform payment by transmitting the specific credit card information as a wireless signal.

In this case, however, when payment is performed using the wireless signal, the mobile terminal needs to be within a predetermined distance from a settlement terminal, and thus, the mobile terminal may be temporarily occupied by someone else who is not the user (owner) of the mobile terminal while the payment is being performed.

SUMMARY OF THE INVENTION

Therefore, an aspect of the detailed description is to provide a mobile terminal in which only a function related to payment is executed when the mobile terminal enters a specific mode for performing payment, and a method for controlling the same.

To achieve these and other advantages and in accordance with the purpose of this specification, as embodied and broadly described herein, a mobile terminal includes: a wireless communication unit configured to perform wireless communication with a settlement terminal; a touch screen configured to output a graphic object corresponding to a payment unit; and a control unit configured to enter a payment mode in which payment is available to be performed by the payment unit corresponding to the graphic object when user authentication information input in relation to the payment unit corresponding to the graphic object is identical to preset authentication information, wherein while the payment mode is being maintained, the control unit executes a first function related to payment by the payment unit corresponding to the graphic object, and limits execution of a second function different to the first function.

In an exemplary embodiment, the control unit may maintain the payment mode for a specific period of time, and when the specific period of time has lapsed, the control unit may limit execution of both the first function and the second function.

In an exemplary embodiment, after it is determined that the user authentication information and the preset authentication information are identical, when a touch for setting the specific period of time is applied to the touch screen, the control unit may enter the payment mode.

In an exemplary embodiment, the specific period of time may be determined on the basis of a length of a touch applied to the touch screen, a direction of the touch, and a duration of the touch.

In an exemplary embodiment, the first function may include a function of payment by the payment unit corresponding to the graphic object, and when the function of payment by the payment unit corresponding to the graphic object is executed, the control unit may control the wireless communication unit to transmit a wireless signal including information regarding the payment unit to the settlement terminal.

In an exemplary embodiment, when the payment mode is entered, the control unit may display an activation region for executing the payment function in at least a portion of the touch screen, and when a touch is applied to the activation region, the control unit may control the wireless communication unit to transmit the wireless signal to the settlement terminal.

In an exemplary embodiment, in response to the execution of the payment function, when information regarding completion of payment by the payment unit is received by the wireless communication unit, the control unit may limit execution of the first function and the second function even before the specific period of time is not lapsed.

In an exemplary embodiment, the first function may include a function of maintaining the payment mode, and when at least one of an event for switching the payment unit corresponding to the graphic object and an event for extending the specific period of time occurs before the specific period of time has lapsed, the control unit may maintain the payment mode even after the specific period of time has lapsed.

In an exemplary embodiment, the event for switching the payment unit may occur when information regarding completion of payment by the payment unit is not received by the wireless communication unit within a preset period of time, after the function of payment by the payment unit corresponding to the graphic object is executed.

In an exemplary embodiment, when the event for switching the payment unit corresponding to the graphic object occurs, the control unit may switch the graphic object to a new graphic object corresponding to a new payment unit according to the switching event and output the same, and start to calculate the specific period of time from a point in time at which the new graphic object is output on the touch screen.

In an exemplary embodiment, the wireless communication unit may perform wireless communication with a preset external device, and when the payment mode is entered, the control unit may control the wireless communication unit to transmit notification information indicating a specific state of the mobile terminal to the preset external device.

In an exemplary embodiment, when it is sensed that strength of a wireless signal received from the preset external device is decreased by a value equal to or greater than a preset ratio on the basis of wireless communication with the preset external device, the control unit may control the wireless communication unit to transmit notification information indicating a relative position of the mobile terminal with respect to the preset external device to the preset external device.

In an exemplary embodiment, while the payment mode is being maintained, when an input for executing the second function is received, the control unit may control the wireless communication unit to transmit notification information indicating that the input for executing the second function has been received, to the preset external device.

In an exemplary embodiment, the wireless communication unit may perform wireless communication with the preset external device, and when a control command related to payment by the payment unit is received by the wireless communication unit from the preset external device, the control unit may execute the first function on the basis of the control command.

In an exemplary embodiment, the second function may be a function specified by user setting among functions executable in the mobile terminal, and when preset authentication is performed by the user while the payment mode is being maintained, the control unit may execute the second function.

When the second function is executed, the control unit may release the payment mode.

To achieve these and other advantages and in accordance with the purpose of this specification, as embodied and broadly described herein, a method for controlling a mobile terminal includes: outputting a graphic object corresponding to a payment unit on a touch screen; determining whether user authentication information input in relation to the payment unit corresponding to the graphic object is identical to preset authentication information; when it is determined that the user authentication information is identical to the preset authentication information, entering a payment mode in which payment is available to be performed by the payment unit corresponding to the graphic object; and while the payment mode is being maintained, executing a first function related to payment by the payment unit corresponding to the graphic object, and limiting execution of a second function different to the first function.

In an exemplary embodiment, the payment mode may be maintained during a specific period of time, and when the specific period of time has lapsed, execution of both the first and second functions may be limited.

In an exemplary embodiment, the first function may include a function of payment by the payment unit corresponding to the graphic object, and the method may further include: when the function of payment by the payment unit corresponding to the graphic object is executed, transmitting a wireless signal including information regarding the payment unit to a settlement terminal.

In an exemplary embodiment, the second function may be a function specified by a user setting among functions executable in the mobile terminal, and the method may further include, while the payment mode is being maintained, when preset authentication is performed by a user, executing the second function.

According to the exemplary embodiment of the present disclosure, while the payment mode in which payment may be performed by a payment unit is maintained, only the function related to the payment is executed, and thus, even though someone else other than the user occupies the mobile terminal, he or she cannot execute other functions or check information using the mobile terminal.

Also, after the function related to payment is executed, when the payment mode is released, access to the mobile terminal is limited until specific authentication by the user is performed, and thus, user privacy and personal information may be protected.

Further scope of applicability of the present application will become more apparent from the detailed description given hereinafter. However, it should be understood that the detailed description and specific examples, while indicating preferred exemplary embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 9A and 9B are views illustrating exemplary embodiments in which a first function is executed on the basis of a control command received from a preset external device.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
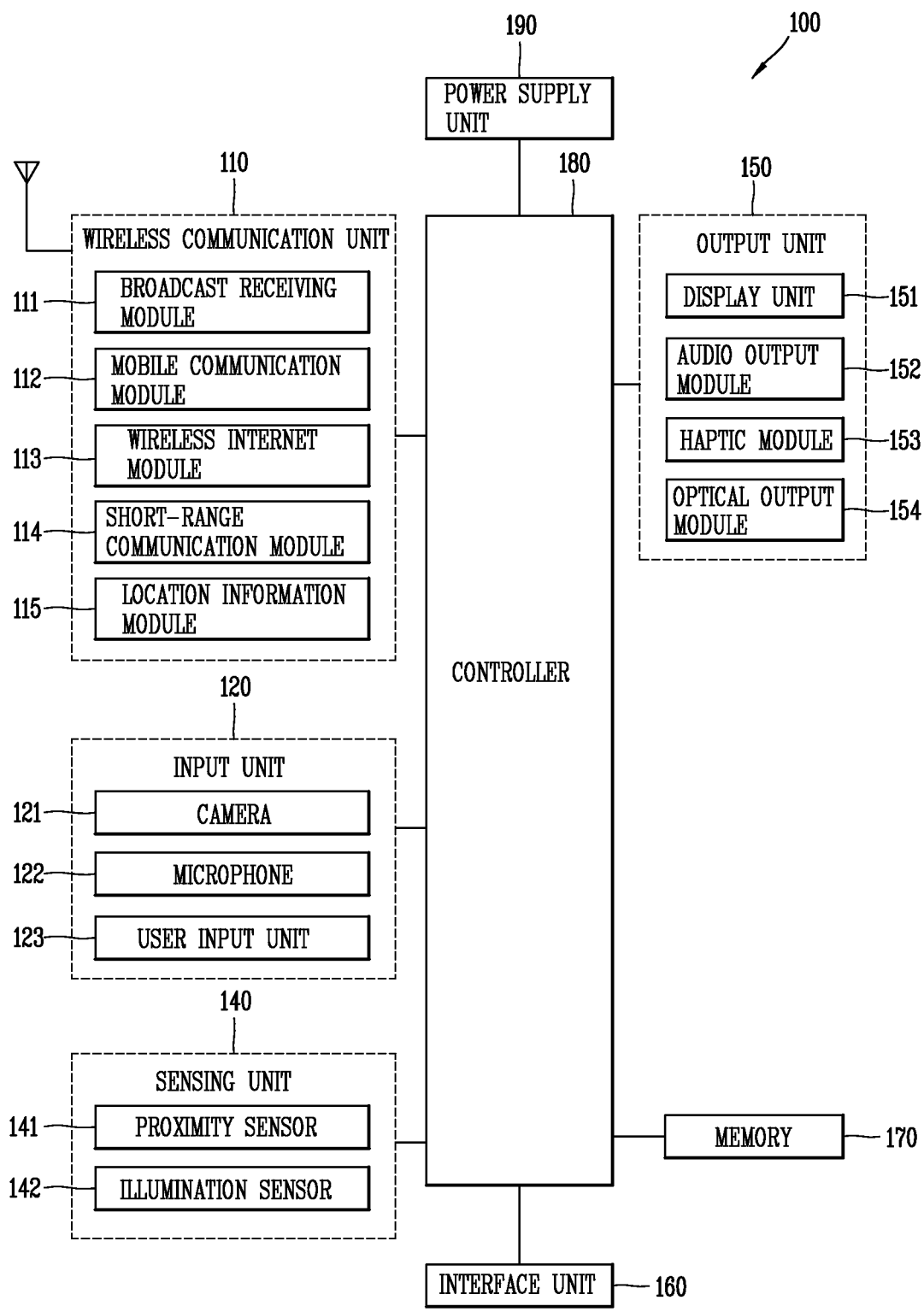
FIG. 1A is a block diagram of a mobile terminal in accordance with the present disclosure.
Figure 1B:
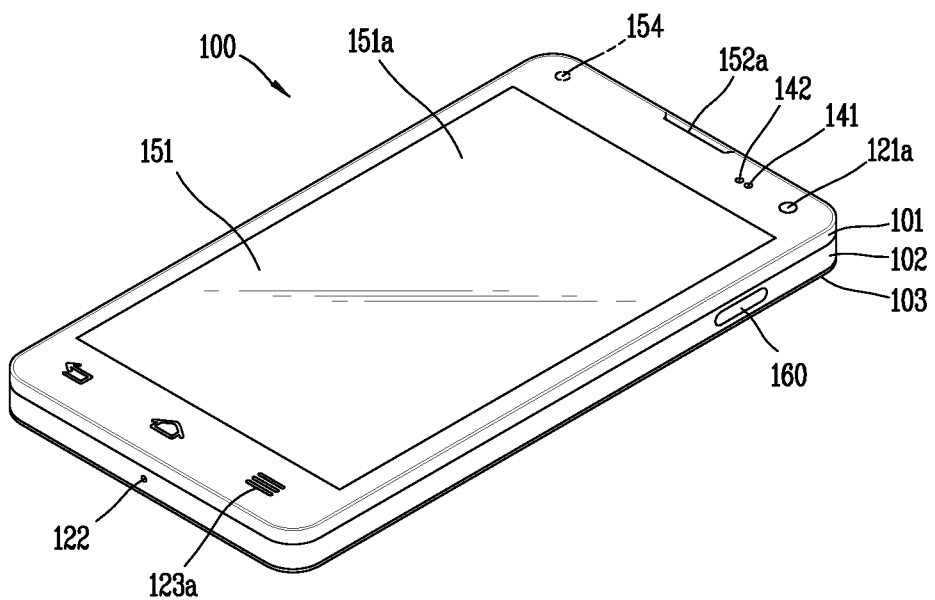
FIGS. 1B and 1C are conceptual views of one example of the mobile terminal, viewed from different directions.
Figure 1C:
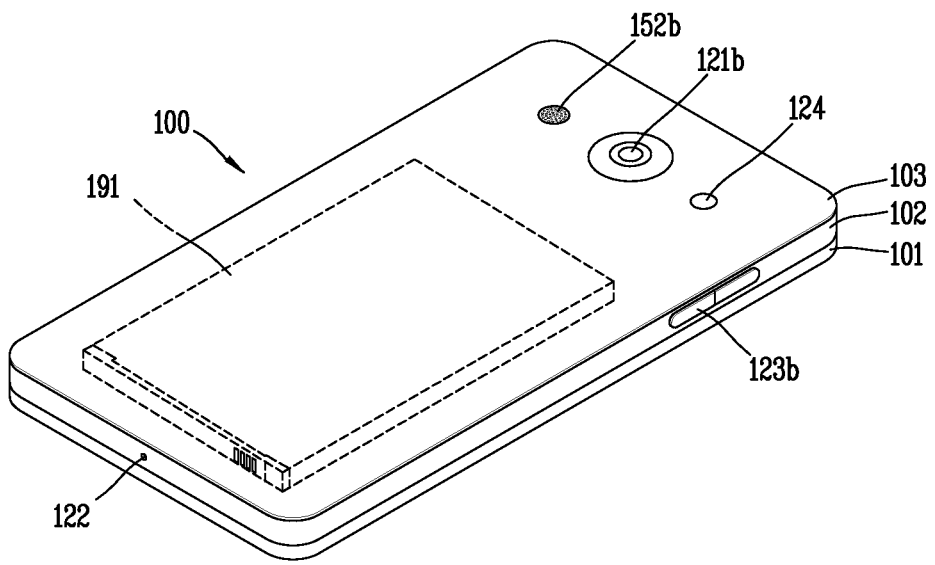

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a control unit 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by control unit 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the control unit 180 to perform an operation (or function) for the mobile terminal 100.

The control unit 180 typically functions to control overall operation of the mobile terminal 100, in addition to the operations associated with the application programs. The control unit 180 may provide or process information or functions appropriate for a user by processing signals, data, information and the like, which are input or output by the various components depicted in FIG. 1A, or activating application programs stored in the memory 170. As one example, the control unit 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the control unit 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the control unit 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The control unit 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, control unit 180 processes data corresponding to proximity touches and proximity touch patterns sensed by the proximity sensor 141, and cause output of visual information on the touch screen. In addition, the control unit 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the control unit 180. Accordingly, the control unit 180 may sense which region of the display unit 151 has been touched. Here, the touch controller may be a component separate from the control unit 180, the control unit 180, and combinations thereof.

In some embodiments, the control unit 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The control unit 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the control unit. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the control unit 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The control unit 180 may typically control the general operations of the mobile terminal 100. For example, the control unit 180 may set or release a lock state for restricting a user from inputting a control command with respect to applications when a status of the mobile terminal meets a preset condition.

The control unit 180 can also perform the controlling and processing associated with voice calls, data communications, video calls, and the like, or perform pattern recognition processing to recognize a handwriting input or a picture drawing input performed on the touch screen as characters or images, respectively. In addition, the control unit 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 10, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the control unit 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

Figure 2:
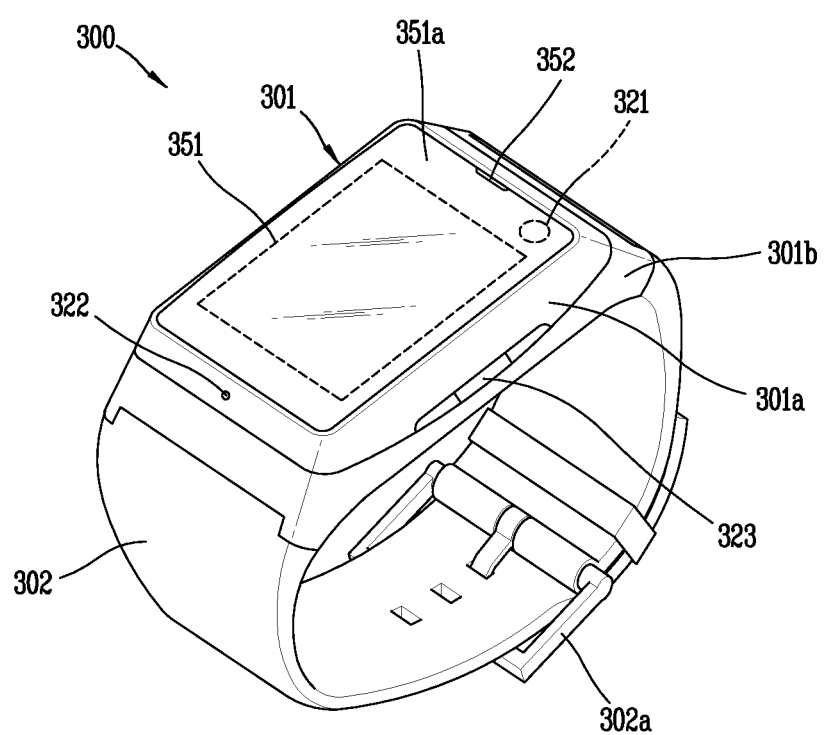
FIG. 2 is a perspective view illustrating an example of an external device 300 related to other exemplary embodiment of the present disclosure.

FIG. 2 is a perspective view illustrating one example of an external device 300 in accordance with another exemplary embodiment.

As illustrated in FIG. 2, the external device 300 includes a main body 301 with a display unit 351 and a band 302 connected to the main body 301 to be wearable on a wrist. In general, external device 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The external device 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 3:
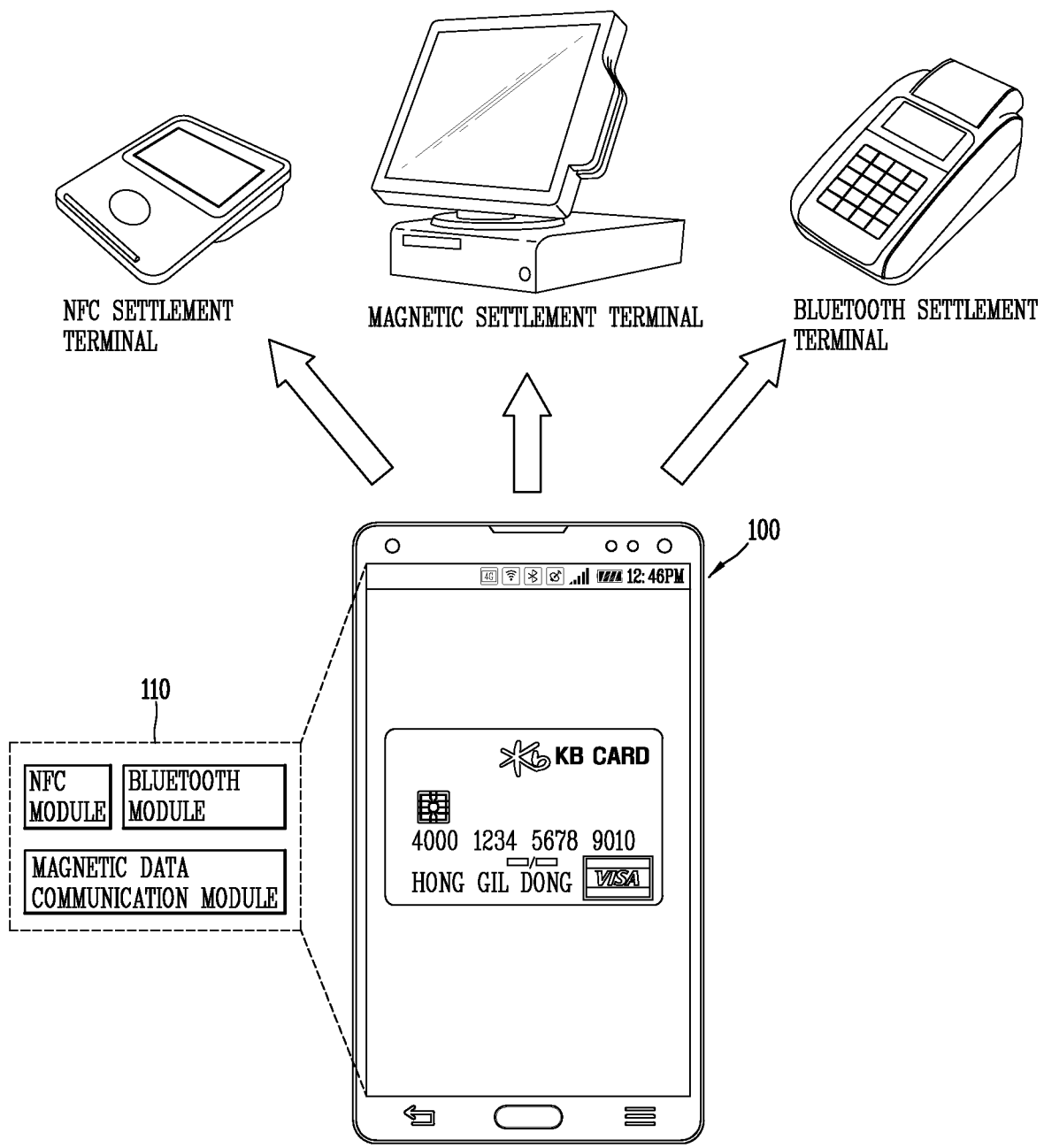
FIG. 3 is a view illustrating an exemplary embodiment in which a mobile terminal according to the present disclosure performs wireless communication with a settlement terminal.

FIG. 3 is a view illustrating an exemplary embodiment in which a mobile terminal according to the present disclosure performs wireless communication with a settlement terminal.

The wireless communication unit 110 of the mobile terminal 100 according to an exemplary embodiment of the present disclosure may include at least one module for performing wireless communication with a settlement terminal. Here, the settlement terminal may correspond to at least one of a near field communication (NFC) settlement terminal, a magnetic settlement terminal, and a Bluetooth™ settlement terminal.

First, in order to perform wireless communication with the NFC settlement terminal, the mobile terminal 100 may include an NFC module. The NFC module may support contactless inter-terminal NFC communication within a distance of about 10 centimeters. Also, the NFC module may operate in any one of a card (payment unit) mode and a P2P mode.

In order for the NFC module to operate in the card (payment unit) mode, the mobile terminal 100 may further include a security module storing card (payment unit) information. Here, the security module may be a physical medium such as a universal integrated circuit card (UICC) (for example, a subscriber identification module (SIM), a universal SIM (USIM)), a secure micro-SD, or a sticker, or may be a logical medium (for example, an embedded secure element (SE) embedded in the mobile terminal 100. Data exchange may be made between the NFC module and the security module on the basis of single wire protocol (SWP).

When the NFC module operates in the card (payment unit) mode, the mobile terminal 100 may be able to transfer stored card information to the outside, like a conventional IC card. In detail, when the mobile terminal 100 storing information regarding a payment unit, like a credit card or a bus card, is brought into proximity to the settlement terminal, mobile near-field payment may be performed. Here, the card information corresponding to the payment unit may be at least one of a card number, a balance, usage particulars, and the card corresponding to the payment unit may be installed in the form of an applet in the security module.

On the other hand, when the NFC module is operated in a peer-to-peer (P2P) mode, the mobile terminal 100 may perform P2P communication with the settlement terminal. In this case, a logical link control protocol (LLCP) may be applied to the P2P communication, and for the P2P communication, a connection may be established between the mobile terminal and the settlement terminal.

Also, in order to perform wireless communication with the Bluetooth™ settlement terminal, the mobile terminal 100 may include a Bluetooth™ module. For example, the Bluetooth™ module of the mobile terminal 100 may receive a beacon signal from the Bluetooth™ settlement terminal. On the basis of the beacon signal, the mobile terminal 100 may be associated with the settlement terminal. When the mobile terminal 100 is associated with the settlement terminal, the Bluetooth™ module may transmit card information corresponding to the payment unit to the Bluetooth™ terminal, thus performing payment.

Also, in order to perform wireless communication with the magnetic settlement terminal, the mobile terminal 100 may include a magnetic data communication module. The magnetic data communication module may convert the card (payment unit) information stored in the mobile terminal 100 into a form of a magnetic field and transmit the magnetic field to the magnetic settlement terminal. The magnetic settlement terminal may perform payment using the payment unit information which have been transmitted in the form of the magnetic field.

Hereinafter, exemplary embodiments related to a control method that may be implemented in the mobile terminal configured as described above will be described with reference to the accompanying drawings. It will be apparent to those skilled in the art that modifications and variations can be made without departing from the spirit and scope of the invention.

In a case in which the mobile terminal according to an exemplary embodiment of the present disclosure performs payment using a payment unit registered in the mobile terminal, the mobile terminal may enter a specific payment mode. Here, in a state in which the mobile terminal has entered the specific payment mode, the mobile terminal may be occupied by someone else (for example, a clerk of a shop, and so on) to perform payment by means of the payment unit. In this situation, while the specific payment mode is being maintained, execution of a function other than the function related to the payment by means of the payment unit may be temporarily limited in the mobile terminal.

Thus, even though the mobile terminal is occupied by someone else in a state in which payment by means of the payment unit is available, accessing the mobile terminal by someone else may be excluded and payment may be stably performed by the payment unit.

Figure 4A:
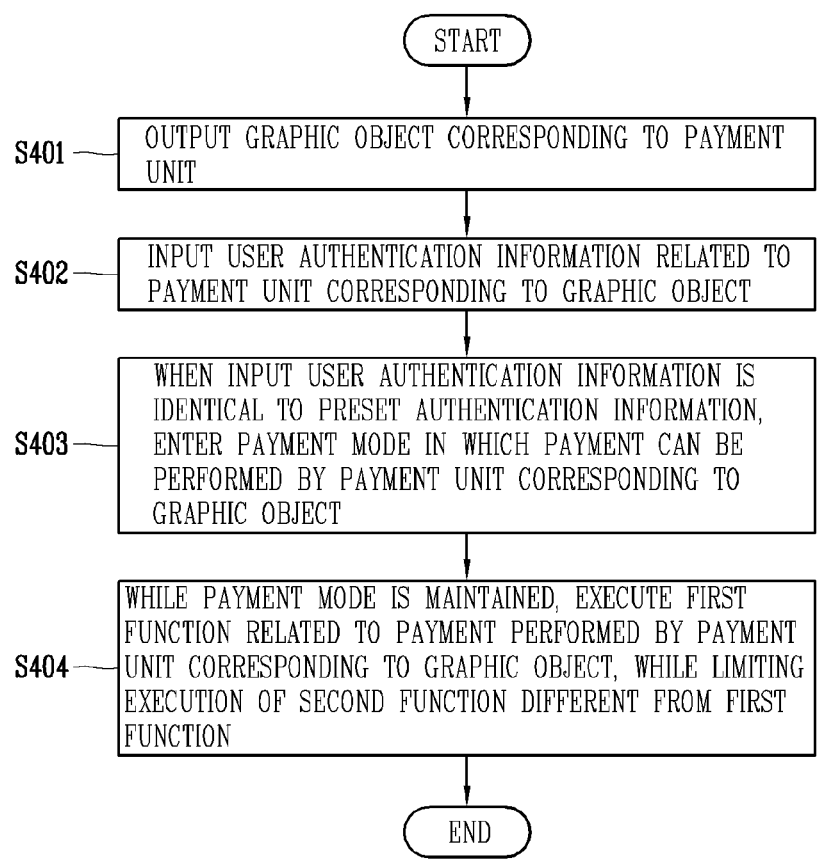
FIG. 4A is a flow chart illustrating a method for controlling a mobile terminal according to an exemplary embodiment of the present disclosure.
Figure 4B:
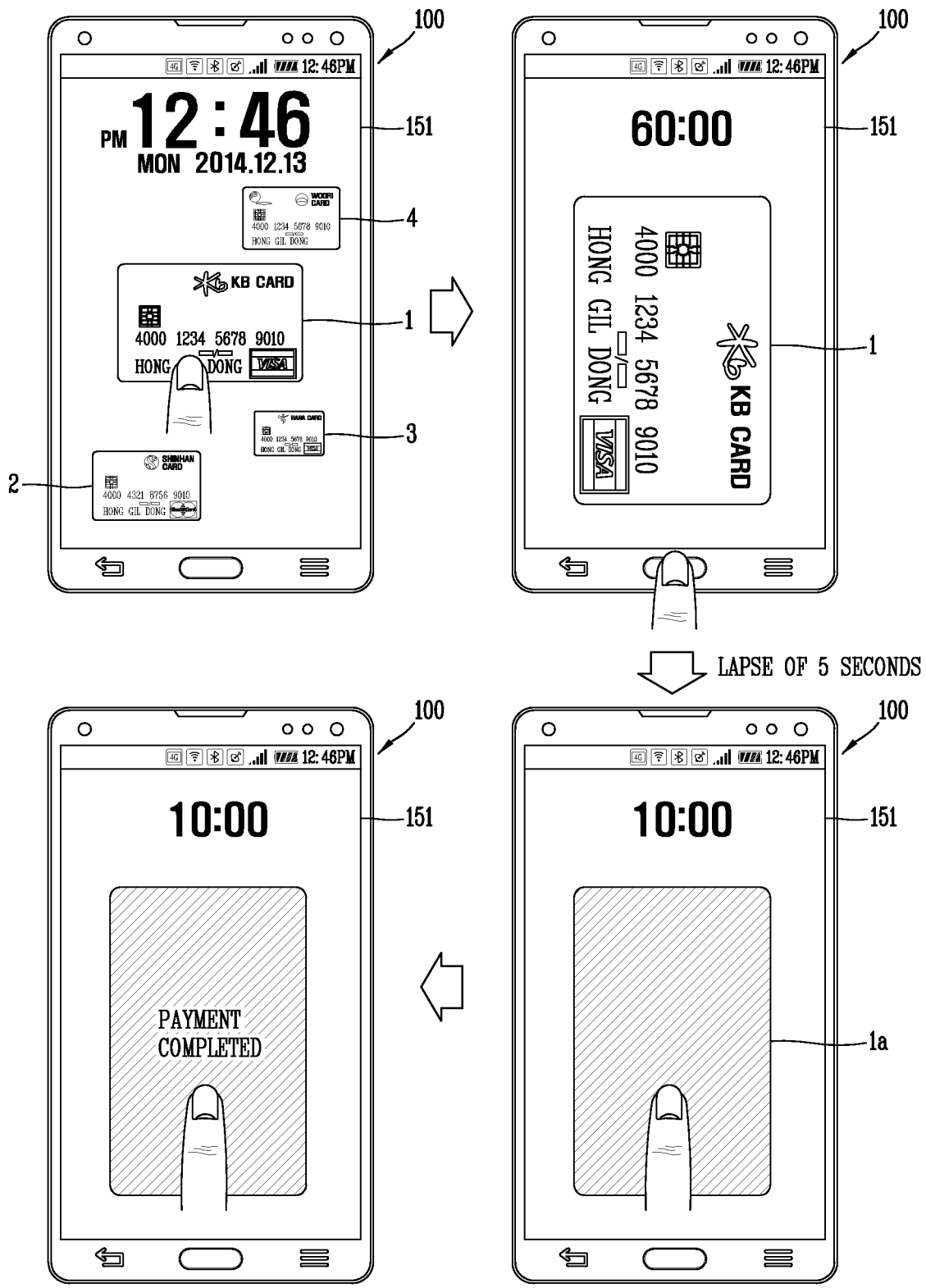
FIGS. 4B and 4C are views illustrating a method for controlling a mobile terminal according to an exemplary embodiment of the present disclosure.
Figure 4C:
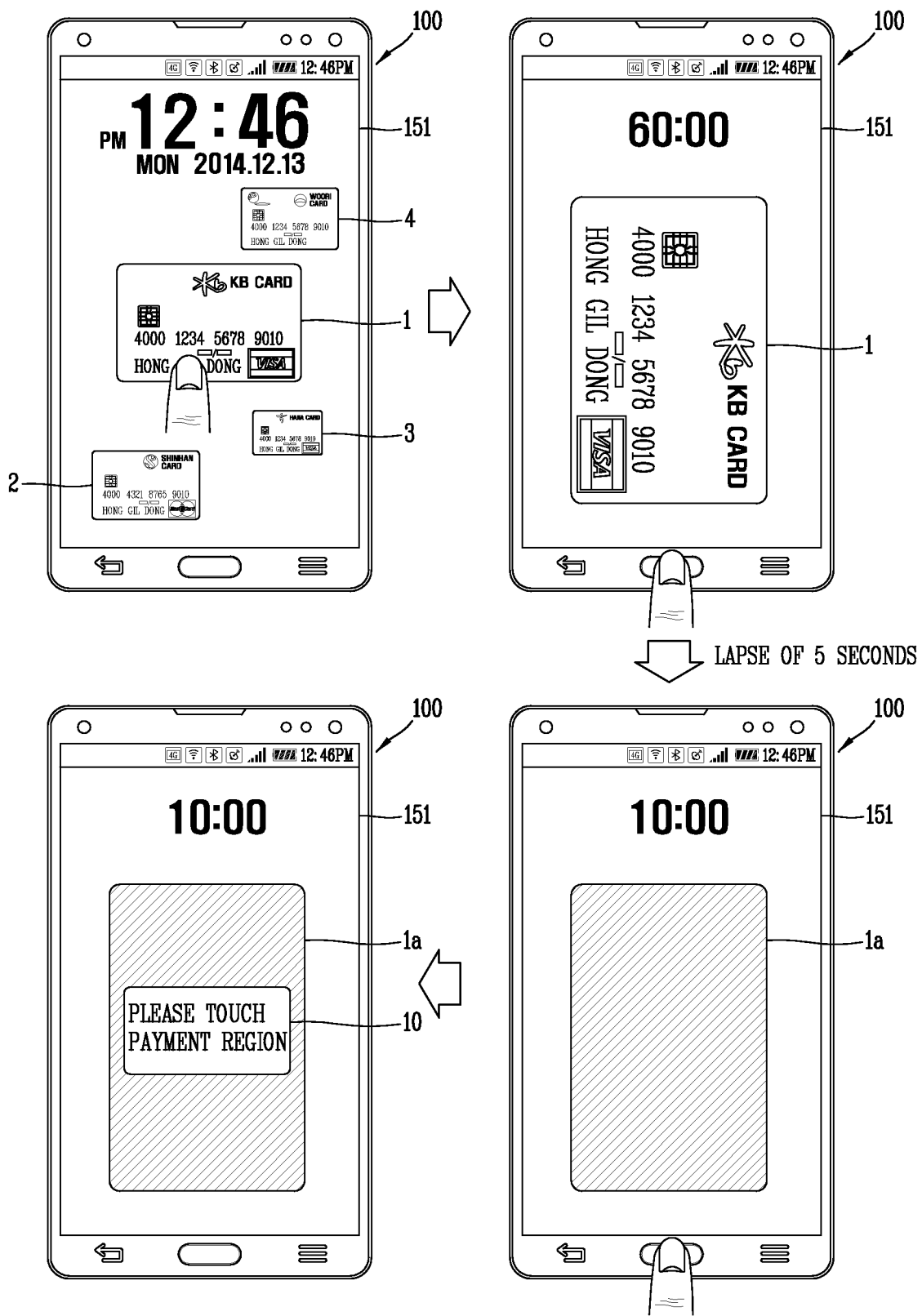

FIG. 4A is a flow chart illustrating a method for controlling a mobile terminal according to an exemplary embodiment of the present disclosure, and FIGS. 4B and 4C are views illustrating a method for controlling a mobile terminal according to an exemplary embodiment of the present disclosure.

First, referring to FIG. 4A, a graphic object corresponding to a payment unit may be output on a touch screen of the mobile terminal according to an exemplary embodiment of the present disclosure (S401).

The payment unit, an object used to perform payment, may be, for example, a credit card or a payment card capable of paying a specific amount of money.

The payment unit and information regarding the payment unit (for example, when the payment unit is a credit card, the information regarding the payment unit may include a card company, a card name, a card number, a valid term, a card holder, and a card validation code (CVD)) may be registered in the mobile terminal in advance.

Also, the mobile terminal may include a payment application for performing payment. On the basis of execution of the payment application, the control unit may control the touch screen 151 to output a graphic object corresponding to the payment unit previously registered in the mobile terminal 100.

For example, when the payment application is executed and a touch in a preset pattern or a password is input by the user, the graphic object may be output on the touch screen 151. Here, on the basis of releasing of a preset type of touch applied to the touch screen 151, the control unit 180 may output the graphic object on the touch screen 151.

Also, in a case in which a plurality of payment units have been registered in the mobile terminal 100, the control unit 180 may control the touch screen 151 to output graphic objects respectively corresponding to the plurality of payment units. Here, when a user's selective input for any one of a plurality of graphic objects is received, the control unit 180 may terminate outputting of the graphic objects other than the any one graphic.

That is, as illustrated in FIG. 4B, graphic objects 1, 2, 3, and 4 respectively matched to a plurality of payment units may be output on the touch screen 151. Here, the graphic objects 1, 2, 3, and 4 may display at least a portion of information regarding the payment units respectively matched thereto. Also, the plurality of graphic objects 1, 2, 3, and 4 may be output in different sizes on the basis of usage frequency or a usage limit of each of the payment units respectively matched to the graphic objects 1, 2, 3, and 4.

Also, in a state in which the plurality of graphic objects 1, 2, 3, and 4 are output, when the user touches any one graphic object 1, outputting of the other graphic objects than the any one graphic object 1 which has been touched may be terminated.

In this manner, in a state in which the graphic object is output, user authentication information related to a payment unit corresponding to the graphic object may be input (S402).

The user authentication information may be information indicating that the user is authorized for the payment unit corresponding to the graphic object. For example, the user authentication information may include at least one of biometric information (fingerprint, iris, face, voice, etc.) of the user, preset password or pattern information, and signature information.

When the user authentication information is input, the control unit 180 may determine whether the user authentication information is identical to preset authentication information. When the user authentication information is identical to the preset authentication information, the control unit 180 may determine that the payment unit is available to be used for payment of the specific amount of money.

That is, as illustrated in the second drawing of FIG. 4B, a user input unit enabling fingerprint recognition may be provided in the mobile terminal 100, and user's fingerprint information may be received through the user input unit. In this manner, when the user's fingerprint information is input, the control unit 180 may determine whether the input fingerprint information is identical to preset authentication information (for example, previously stored user's fingerprint information).

When the user authentication information is identical to the preset authentication information, the control unit 180 may enter a payment mode in which payment may be performed by the payment unit corresponding to the graphic object (S403).

Here, the payment mode is a mode in which payment for a specific amount of money may be performed by using the payment unit corresponding to the graphic object, and the payment mode may be maintained for a specific period of time. Also, the specific period of time may be determined according to a user setting.

The payment mode may be activated when the user authentication information is identical to the preset authentication information. Also, in a state in which the user authentication information is identical to the preset authentication information, when a preset condition is met, the control unit 180 may enter the payment mode.

For example, as illustrated in the second drawing of FIG. 4B, when it is determined that user's fingerprint information is identical to previously stored fingerprint information and when a preset period of time (5 seconds) has lapsed, the control unit 180 may enter the payment mode.

When the payment mode is entered, the control unit 180 may control the touch screen 151 not to display at least a portion of the information regarding the payment unit in the graphic object. That is, as illustrated in the third drawing of FIG. 4B, at least a portion of the information regarding the payment unit corresponding to the graphic object 1 may be covered through shading.

Also, the control unit 180 may display information regarding the specific period of time on the touch screen 151. That is, as illustrated in the second drawing of FIG. 4B, in a state in which any one graphic object 1 is output, the specific period of time (for example, 60 seconds) during which the payment mode is maintained may be displayed in a region of the touch screen 151.

Here, the specific period of time may be calculated when the payment mode is entered. That is, as illustrated in the third drawing of FIG. 4B, after the payment mode is entered, display of the specific period of time may be changed with the passage of time.

In this manner, while the payment mode is maintained, the control unit 180 may execute a first function related to payment by the payment unit corresponding to the graphic object and limit execution of a second function different to the first function (S404).

That is, while the payment mode is maintained, execution of functions other than the first function may be limited. That is, in the payment mode, the mobile terminal 100 may be in a temporary locked state of the second function in which execution of the second function different to the first function is limited.

Here, the first function may include various functions related to payment by the payment unit.

For example, the first function may include a payment function by which a specific amount of money is paid using the payment unit. When the payment function is executed, the control unit 180 may control the wireless communication unit 110 to transmit information regarding the payment unit to the settlement terminal. Also, as the payment function is executed, the control unit 180 may control the wireless communication unit 110 to receive payment completion information.

Also, when additional authentication is required for execution of the payment function, the payment function may include a function of performing additional authentication. For example, in a case in which user signature is required for executing the payment function, the control unit 180 may execute a function of receiving a user signature.

In another example, the first function may include a function of maintaining the payment mode. As described above, when the payment mode is released, execution of the payment function by the payment unit may be limited. Thus, the control unit 180 may execute the function of continuously maintaining the payment mode such that the payment mode may not be released.

In this case, the function of maintaining the payment mode may be executed on the basis of occurrence of a specific event. In detail, when an event for extending the specific period of time occurs before the specific period of time has lapsed, the control unit 180 may execute the function of maintaining the payment mode. Also, when an event for switching the payment unit to a new payment unit occurs in the payment mode, the control unit 180 may execute the function of maintaining the payment mode. Details thereof will be described with reference to FIGS. 6A, 6B, and 6C hereinafter.

In contrast, the second function may be a function specified by the user limited in execution while the payment mode is maintained, among functions that may be executed in the mobile terminal. For example, the second function may be specified as various functions such as a function of executing an application different to the payment application, a function of searching or checking specific information, a function of turning off power of the mobile terminal, and the like.

While the payment mode is maintained, the control unit 180 may selectively execute the first and second functions. For example, while the payment mode is maintained, when a control command for executing the first function is received, the control unit 180 may execute the first function. However, when a control command for executing the second function is received while the payment mode is maintained, the control unit 180 may limit execution of the second function.

That is, as illustrated in the third drawing of FIG. 4B, when a control command is received through the graphic object, the control unit 180 may execute the payment function by a payment unit corresponding to the graphic object 1.

When the payment function is executed in this manner, the control unit 180 may transmit a wireless signal including information regarding the payment unit to the settlement terminal. In a case in which payment completion information is received in response to the execution of the payment function, the control unit 180 may display information indicating that payment by the payment unit has been completed (payment completion) in a region of the touch screen 151 as illustrated in the fourth drawing of FIG. 4B.

As illustrated in the third drawing of FIG. 4C, a control command for executing the second function (for example, a function of outputting a home screen page) may be received. In this case, the control unit 180 may limit execution of the function according to the control command.

As illustrated in a fourth drawing of FIG. 4C, the control unit 180 may output information 10 requesting a control command for executing the first function may be output on the touch screen 151. For example, in a case in which the first function is executed by a touch applied to a graphic object 1a, the control unit 180 may output information requesting a touch input with respect to the payment region corresponding to the graphic object 1a. Alternatively, the control unit 180 may output information indicating that execution of the second function is limited by the control command on the touch screen 151.

Meanwhile, the payment mode may be released when the specific period of time has lapsed. Also, the payment mode may be released when payment by the payment unit is completed or when payment by the payment unit fails. When the payment mode is released, the mobile terminal 100 may limit execution of both the first and second functions. Details thereof will be described with reference to FIG. 10A hereinafter.

In this manner, while the payment mode is maintained, the control unit 180 may selectively execute only the first function related to payment by the payment unit. For example, while the payment mode is maintained, the control unit 180 may process only a control command for executing the first function.

Also, the control unit 180 may specify and provide an input region of a control command for executing the first function, in order to induce the user to input a control command for executing the first function.

As described above, the payment mode may be maintained for a specific period of time, and the user may directly set the specific period of time. Here, the control unit 180 may receive an input for setting the specific period of time from the user before entering the payment mode.

That is, the control unit 180 may perform preset authentication using the user authentication information, and subsequently control the touch screen 151 to receive setting of a specific period of time. And then, on the basis of a touch applied to the touch screen 151, setting of a specific period of time may be received.

Thus, before entering the payment mode related to a payment unit selected by the user, the user may directly set a period of time for performing payment by using the payment unit. Also, in this case, the control unit 180 may enter the payment mode at a point in time at which the touch applied to set the specific period of time is released.

Figure 5A:
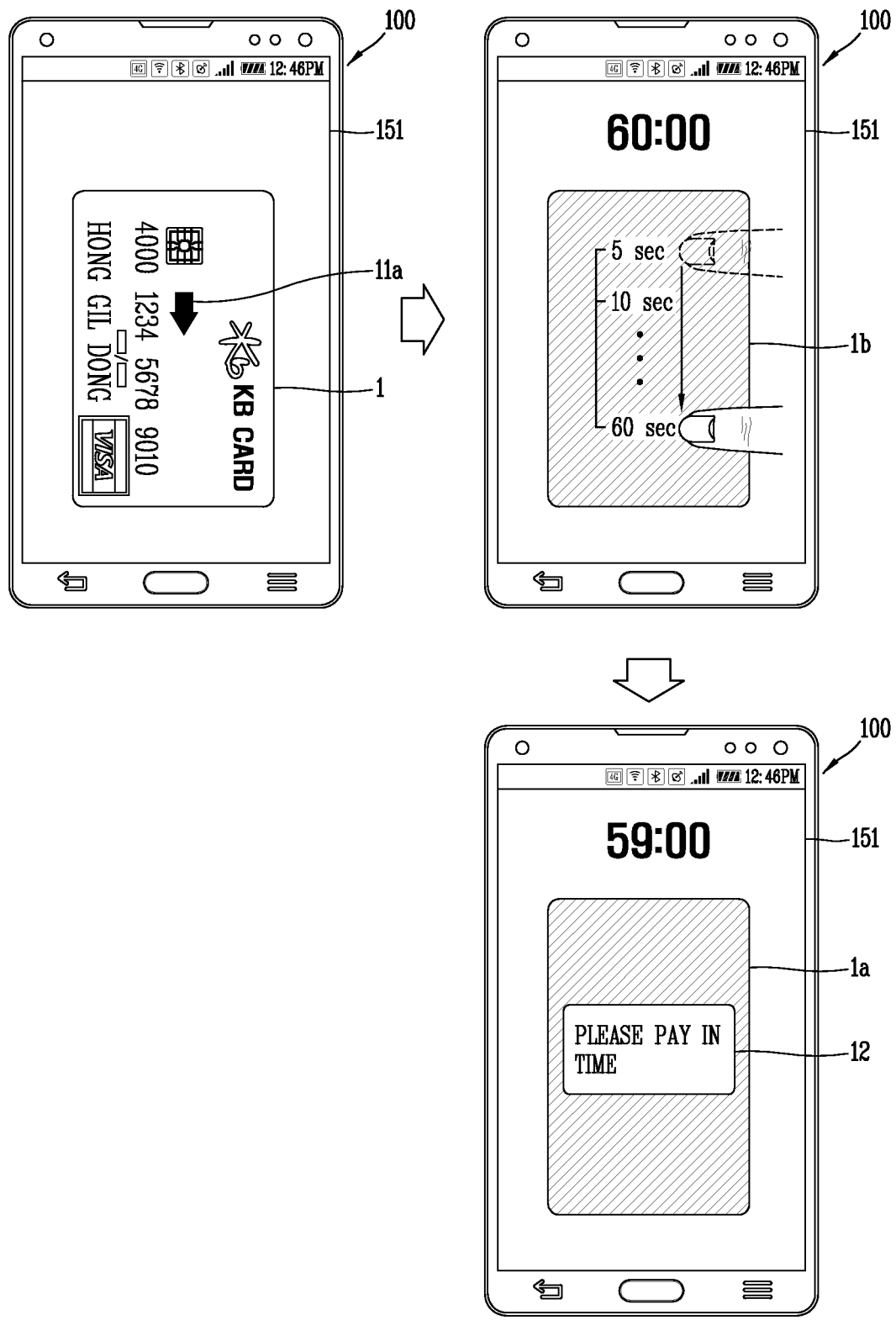
FIGS. 5A, 5B, and 5C are views illustrating various exemplary embodiments in which a period of time for maintaining a payment mode is set.
Figure 5B:
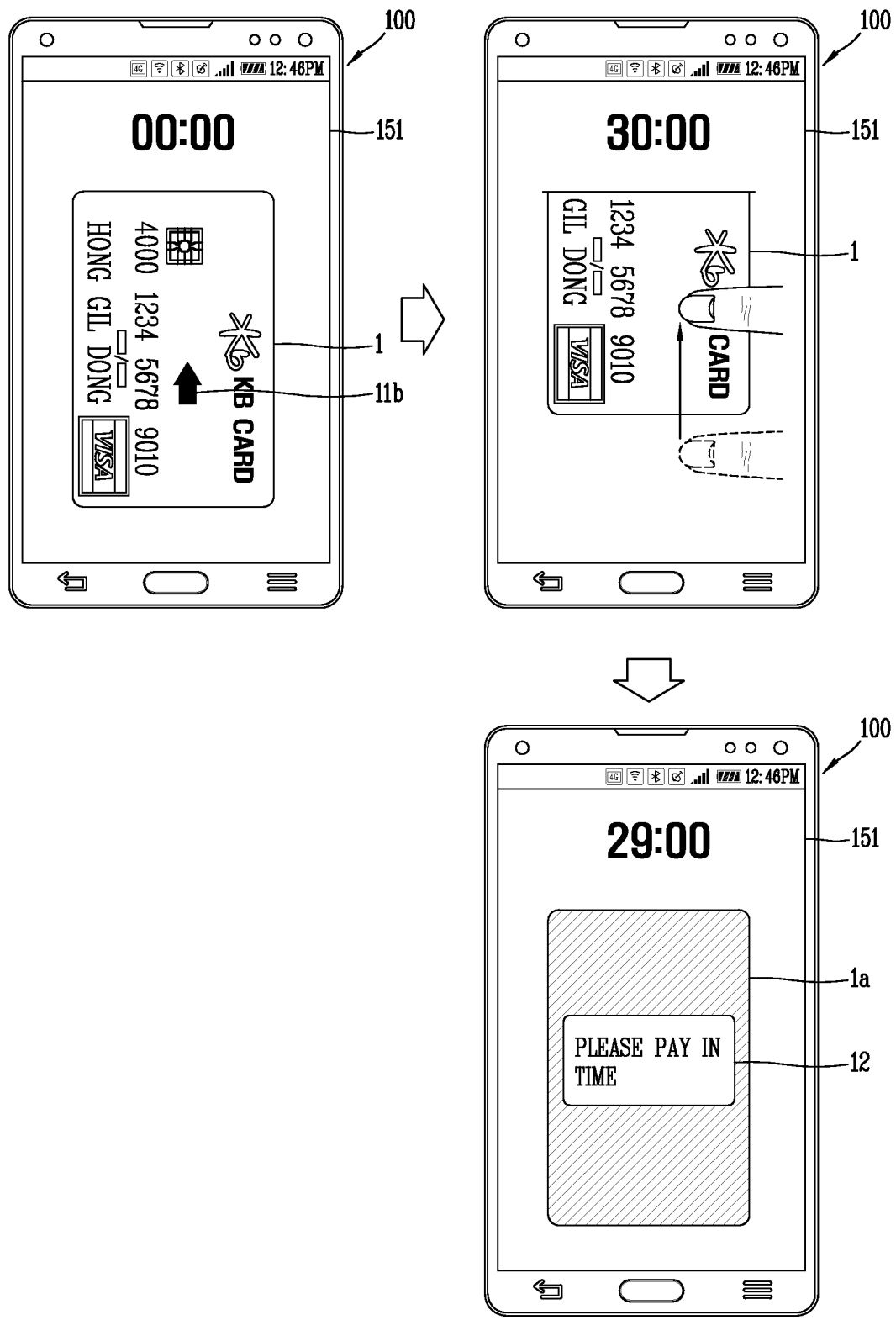
Figure 5C:
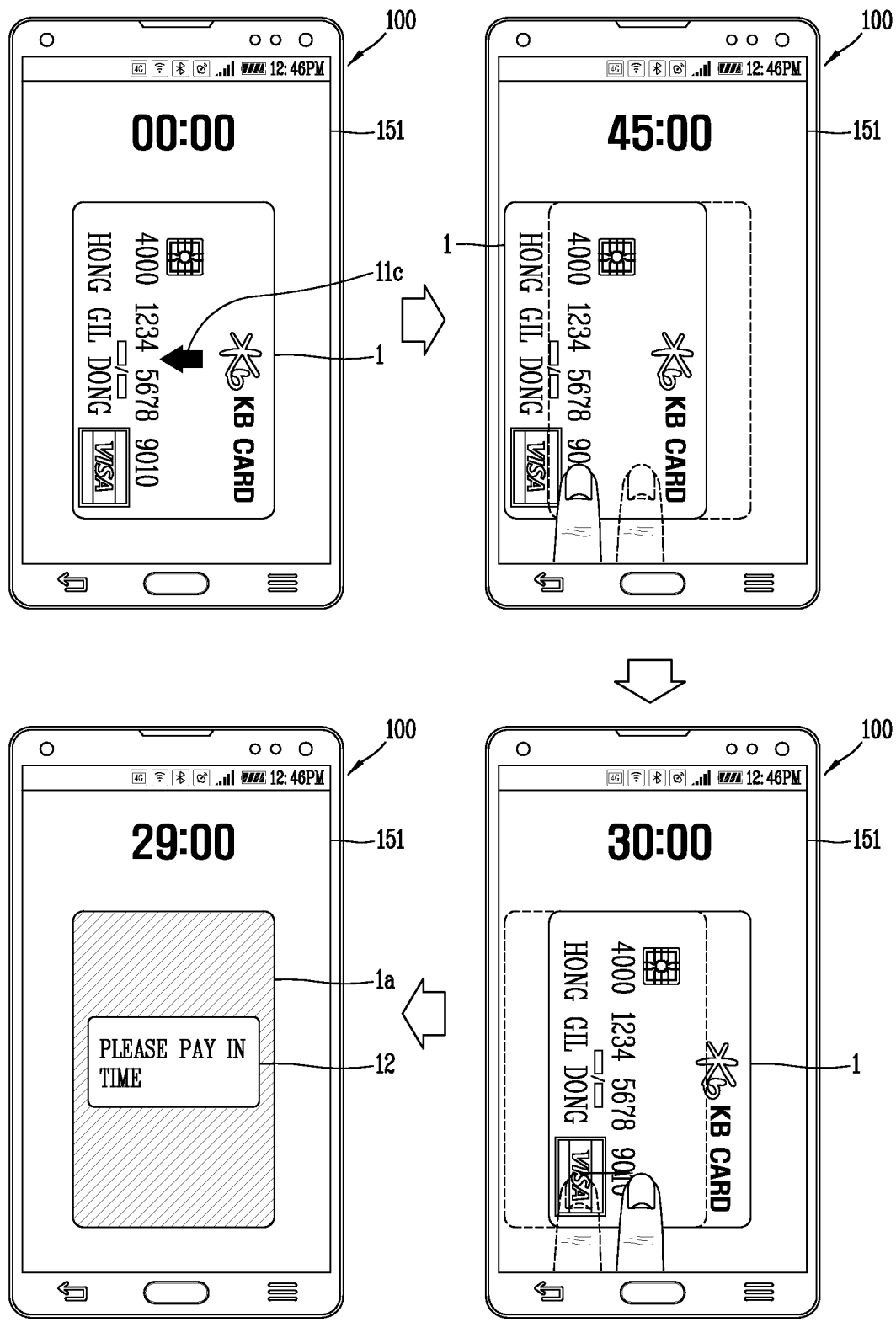

FIGS. 5A, 5B, and 5C are views illustrating various exemplary embodiments in which a period of time for maintaining a payment mode is set.

First, referring to FIG. 5A, a graphic object 1 corresponding to a payment unit is output on the touch screen 151, and an object 11a including direction information for inputting the specific period of time may be displayed in the graphic object.

In a state in which the object 11a is displayed, when a touch is applied to the graphic object 1, the control unit 180 may output a graphic object 1b displaying information regarding a set range of the specific period of time as illustrated in a second drawing of FIG. 5A.

Also, in a case in which the touch is continuously applied in a direction corresponding to the object 11a and released from a point (60 sec) within the set range of the specific period of time, the control unit 180 may set a time corresponding to the touch-released point, as the specific period of time. In this case, the control unit 180 may display the information of the set specific period of time in a region of the touch screen 151.

Also, on the basis of the released touch, the control unit 180 may enter the payment mode. Here, the particular period of time may start to be calculated from a point at which the touch was released. Thus, as illustrated in a third drawing of FIG. 5A, the information of the specific period of time changing with the passage of time may be displayed in a region of the touch screen 151. Also, in order for the user to recognize the entered payment mode, the control unit 180 may output information 12 inducing execution of the payment function on the touch screen 151 while the payment mode is maintained.

Alternatively, the control unit 180 may not provide the set range of the specific period of time. In this case, the user may freely set the specific of time by adjusting a degree of applying a touch.

That is, referring to FIG. 5B, in a state in which the graphic object 1 is output on the touch screen 151, an object 11b including direction information for receiving a touch to set the specific period of time may be displayed. Also, information regarding the specific period of time (before setting, 0 sec.) may be displayed in a region of the touch screen 151.

In order for the user to visually check a degree of the touch, the control unit 180 may display a visual effect on the touch screen 151 on the basis of a touch applied in a direction corresponding to the direction information.

For example, as illustrated in a second drawing of FIG. 5B, the touch screen 151 may be controlled to make at least a portion of the graphic object 1 disappear according to the touch. Also, in order to correspond to a degree to w which the touch is applied, the control unit 180 may change information regarding the specific period of time to display the same.

Thereafter, when the touch is released, the mobile terminal 100 may enter the payment mode as illustrated in a third drawing of FIG. 5B.

Also, on the basis of a direction of the touch applied to the touch screen 151, the control unit 180 may increase or decrease the specific period of time.

That is, as illustrated in a first drawing of FIG. 5C, in a state in which an object 11c including direction information of a touch for setting the specific period of time is output on the graphic object 1, a touch may be applied to correspond to the direction. Here, the direction according to the object 11c may be a direction perpendicular to a length direction of the mobile terminal 100.

Here, as illustrated in a second drawing of FIG. 5C, in a case in which a touch is applied in a direction according to the object 11c, the control unit 180 may increase the specific period of time to correspond to the touch. Thus, the information of the specific period of time displayed in a region of the touch screen 151 may be increased (45 seconds) to correspond to the touch so as to be displayed.

Also, in a state in which the user has not released the touch applied in the direction according to the object 11c, the user may continuously apply a touch in a direction opposite to the direction according to the object 11c. In this case, the control unit 180 may decrease the increased specific period of time (45 seconds) to correspond to the touch applied in the opposite direction. Accordingly, a decreased specific period of time (30 seconds) may be displayed in a region of the touch screen 151 as illustrated in a third drawing of FIG. 5C.

Thereafter, at a point in time at which the user's touch is released, the control unit 180 may enter the payment mode.

In this manner, on the basis of at least one of a direction of the touch, a degree to which the touch is applied, and a period of time during which the touch is maintained, the user may set a period of time during which the payment mode is to be maintained. Thus, when the user selects any one payment unit, the user may directly set a period of time for executing a payment function in relation to the selected payment unit. Also, the user may conveniently set the specific period of time using various touch methods.

As described above, the first function may include the payment function by the payment unit and the function of maintaining the payment mode. While the payment mode is maintained, the control unit 180 may execute the function of maintaining the payment mode.

For example, the specific event may be an event of changing a payment unit corresponding to the graphic object. The event of changing the payment unit may occur when payment is not completed in response to execution of the payment function by the payment unit. For example, the event of changing the payment unit may occur in a situation in which the payment unit corresponding to the graphic object cannot be able to pay a specific amount of money because the payment unit has exceeded a limit thereof or has expired a validity term thereof.

In this case, after a wireless signal including information regarding the payment unit was transmitted to the settlement terminal, if payment completion information is not received within a preset period of time, the control unit 180 may determine that the event of changing the payment unit has occurred. Here, the control unit 180 may switch the payment unit corresponding to the graphic object to a new payment unit, and maintain the payment mode regarding the new payment unit.

In another example, the specific event may be an event of extending a period of time (specific period of time) during which the payment mode is maintained. The specific period of time may be extended a predetermined number of times. In this case, the control unit 180 may maintain the payment mode during the period of time corresponding to the preset number of times.

Meanwhile, when the specific event occurs may vary depending on setting of a security level in the payment mode. Here, the security level may be a measure related to a limit to which the first function may be executed without additional user authentication in the payment mode.

For example, in a case in which the security level is set to a low level, the payment unit corresponding to the graphic object may be switched while the payment mode is being maintained. Also, the period of time during which the payment mode is maintained may be extended.

Figure 6A:
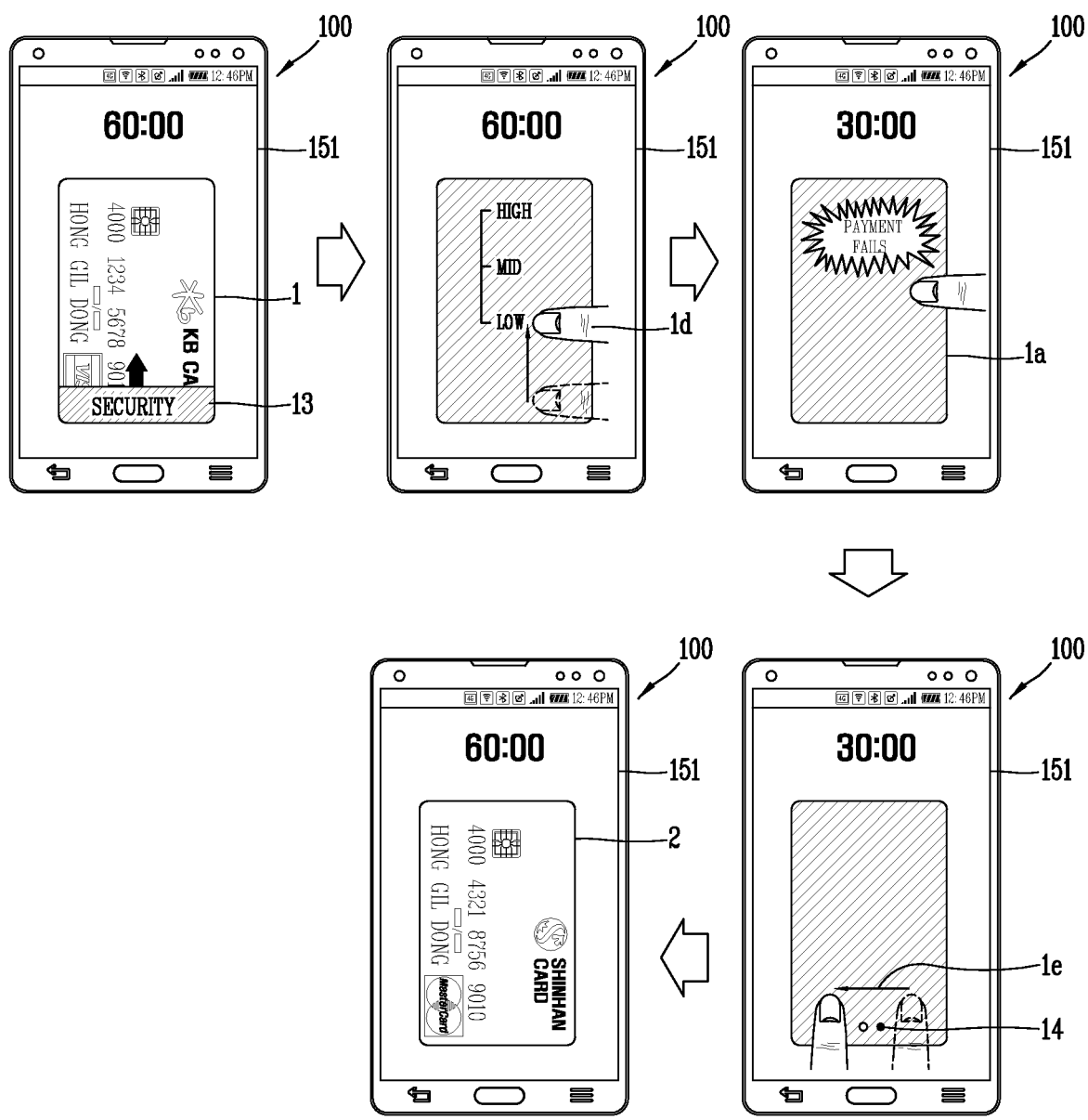
FIGS. 6A, 6B, and 6C are views illustrating exemplary embodiments related to execution of a function of maintaining a payment mode according to the present disclosure.

That is, referring to FIG. 6A, in a state in which a graphic object 1 corresponding to a payment unit is output on the touch screen 151, a security level may be set before entering the payment mode. On the basis of a touch applied to a security level setting object 13 displayed in a region of the graphic object 1, the control unit 180 may set a security level of the payment unit corresponding to the graphic object 1.

In detail, when a touch is applied to the security level setting object 13, the control unit 180 may switch the graphic object 1 to a graphic object 1d displaying information of a security level setting range and output the same. As illustrated in a second drawing of FIG. 6A, when a user's touch is released from a point corresponding to a low level of the security level setting range, the control unit 180 may set the security level regarding the payment unit to a low level and enter the payment mode.

In a state in which the payment mode is maintained, the payment function regarding the payment unit may be executed and the control unit 180 may transmit information regarding the payment unit to the settlement terminal. Also, after the payment function is executed, if information indicating completion of payment by the payment unit (for example, reception of payment particulars from a card company) is not received within a preset period of time, the control unit 180 may determine that the payment has failed.

When it is determined that the payment has failed, the control unit 180 may display information indicating the payment failure (settlement failure) in a region of the touch screen 151 as illustrated in a third drawing of FIG. 6A. Also, the control unit 180 may determine that a payment unit switch event has occurred.

Here, when a touch is applied to the graphic object 1a, the control unit 180 may switch the graphic object 1a to a graphic object 1e representing a guide object 14 according to the touch for switching to new payment as illustrated in a fourth drawing of FIG. 6A. Thus, when the user's touch is applied in a direction corresponding to the guide object 14, a new graphic object 2 corresponding to a new payment unit may be output on the touch screen 151 as illustrated in a fifth drawing of FIG. 6A.

In this case, starting from a point in time at which the new graphic object 2 corresponding to the new payment unit is output on the touch screen 151, the control unit 180 may newly calculate the specific period of time. Although not shown, when a security level is set to a low level, the specific period of time may be extended by a preset number of times with respect to the payment unit corresponding to the graphic object output on the touch screen 151.

Figure 6B:
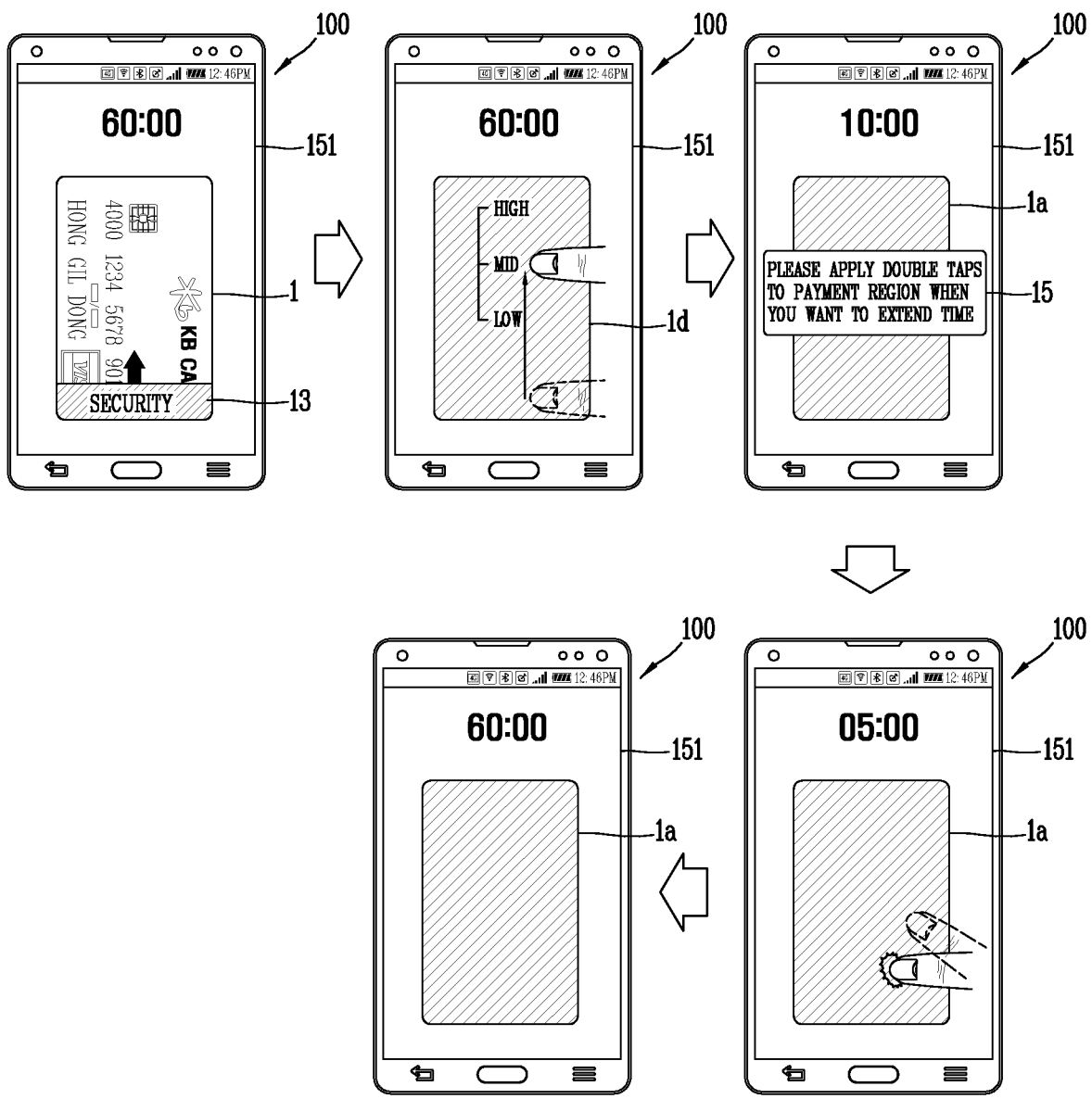

Alternatively, as illustrated in a second drawing of FIG. 6B, when the user's touch is released from a point of a middle step of the security level setting range, the control unit 180 may set security regarding the payment unit to a middle level and enter the payment mode.

Here, as illustrated in a third drawing of FIG. 6B, before the specific period of time during which the payment mode is maintained has lapsed (for example, when a residual time with respect to the specific period of time is less than a preset time, information 15 inducing input for extending the specific period of time may be output on the touch screen 151.

As illustrated in a fourth drawing of FIG. 6B, when a user's touch is applied in response to the output of information 15, the control unit 180 may determine that an event for extending the specific period of time has occurred. Thus, the specific period of time may be extended as illustrated in a fifth drawing of FIG. 6B.

Figure 6C:
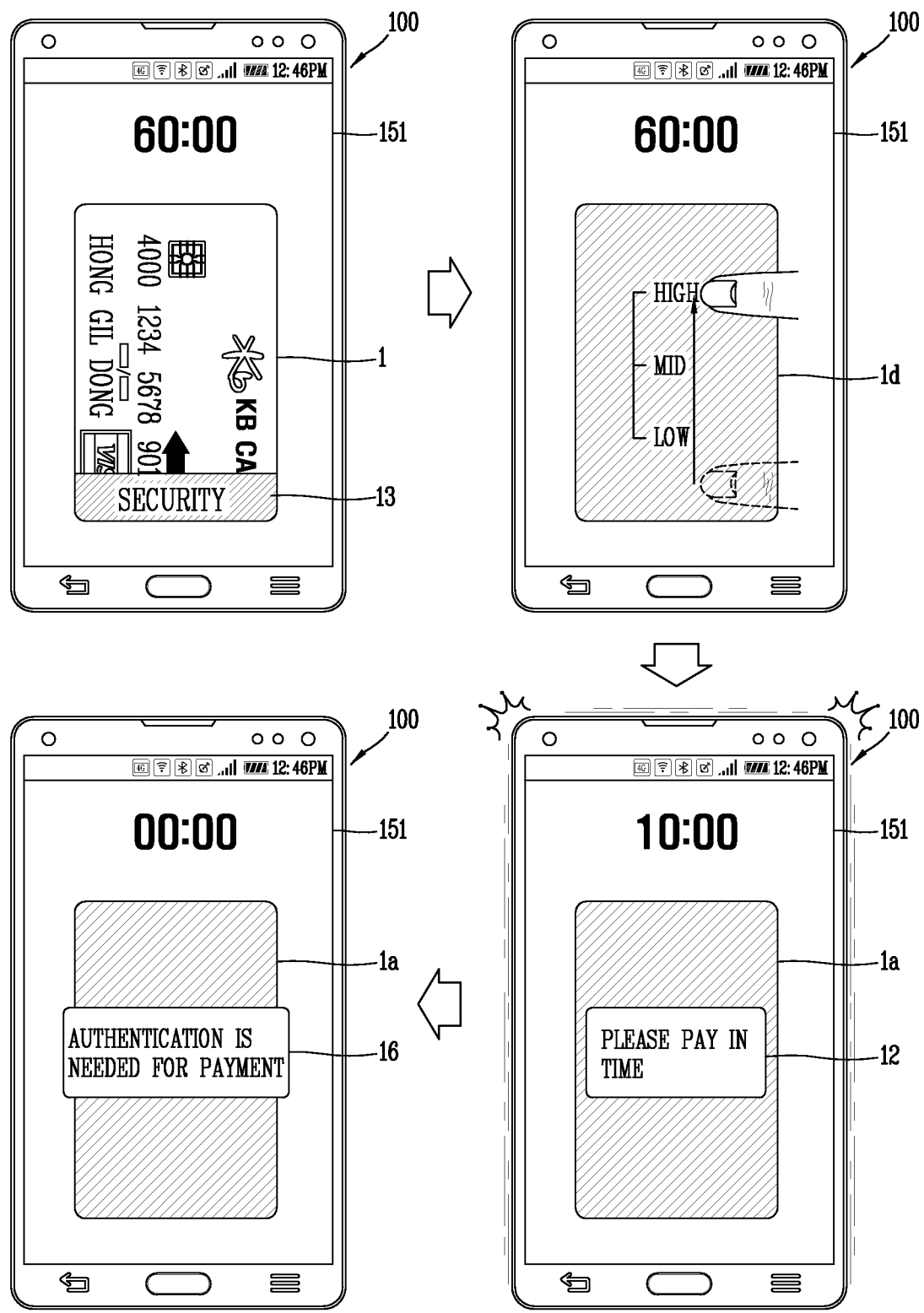

In another example, as illustrated in a second drawing of FIG. 6C, in a case in which the security level is set to a high level, the control unit 180 may perform control such that the function of maintaining the payment mode is available through additional user authentication. That is, in a case in which payment by the payment unit fails or in a case in which the specific period of time has lapsed, the control unit 180 may release the payment mode and request additional user authentication.

For example, as illustrated in a third drawing of FIG. 6A, in a case in which a residual time of the specific period of time is less than the preset time, information 12 for inducing execution of the payment function within the residual time may be output in a region of the touch screen 151. Also, the control unit 180 may output information (for example, specific vibration or audible information) indicating expiration of the specific period of time through a haptic module or an audio output unit.

Here, as illustrated in a fourth drawing of FIG. 6C, in a case in which the specific period of time has lapsed without executing the payment function in the payment mode, information 16 requesting additional user authentication may be output on the touch screen 151.

Thus, before entering the payment mode, the user may directly set a limit for performing the first function without additional authentication in the payment mode state in relation to a payment unit selected by the user. Also, the user may set appropriate security levels differently according to types of payment units, whereby the user may conveniently safely execute the payment function according to types of payment units.

The second function limited while the payment mode is being maintained may be variously set. That is, the second function may be set as various functions such as a function of executing an application different to the payment application, a function of switching the screen output on the touch screen 151, and the like.

In a specific example, in a case in which an event is received by the mobile terminal while the payment mode is being maintained, the user may set a function of checking information regarding the event, as the second function. In this case, while the payment mode is being maintained, the control unit 180 may limit execution of a function according to a user's control command for executing the second function.

Figure 7A:
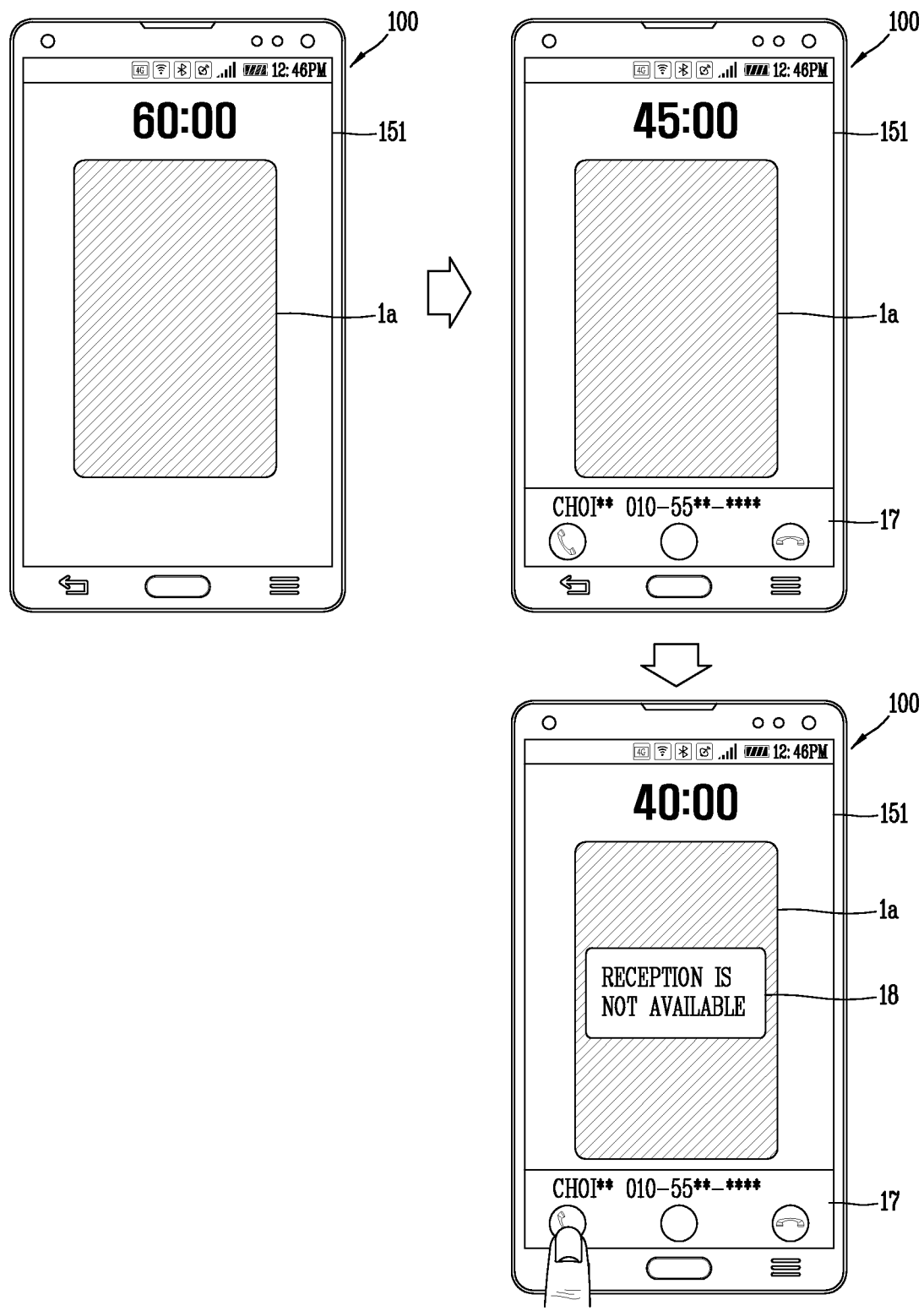
FIGS. 7A and 7B are views illustrating exemplary embodiments when an event is received while a payment mode is being maintained.
Figure 7B:
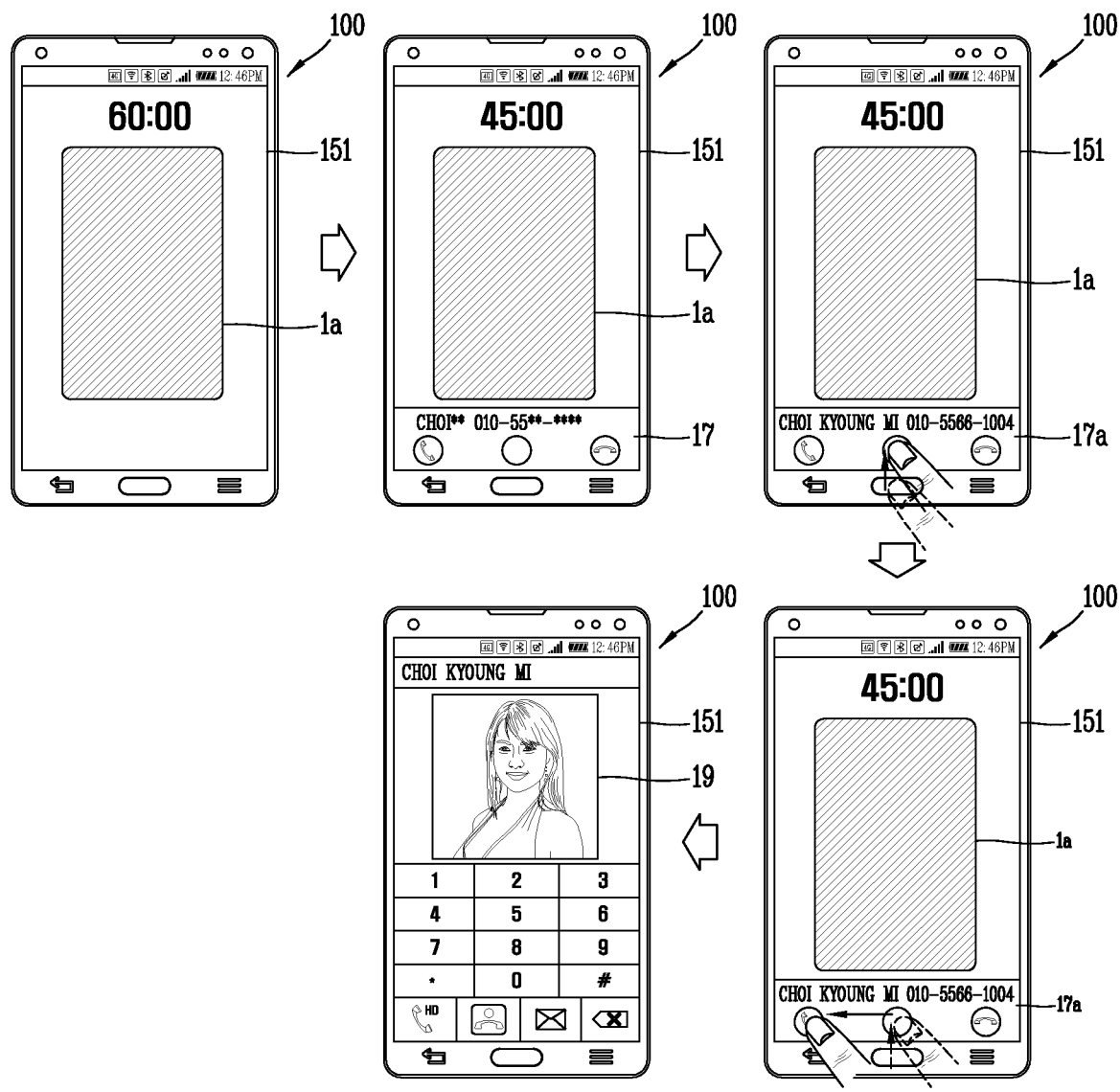

This will be described with reference to FIGS. 7A and 7B. FIGS. 7A and 7B are views illustrating exemplary embodiments when an event is received while a payment mode is being maintained.

Referring to a first drawing of FIG. 7A, in a state in which the payment mode is entered, an event (for example, call reception) may be received by the mobile terminal 100 as illustrated in a second drawing of FIG. 7A. In this case, the control unit 180 may control the touch screen 151 to display a screen 17 indicating the reception of the event in a region of the touch screen 151. Here, outputting of at least a portion of the received event information may be limited.

Here, as illustrated in a third drawing of FIG. 7A, when the user requests to check the received event, the control unit 180 may limit execution of the function requested by the user. Also, the control unit 180 may display information indicating limitation of function execution in a region of the touch screen 151.

Alternatively, even while the payment mode is being maintained, when preset authentication is performed by the user, the second function may be executed.

That is, as illustrated in a second drawing of FIG. 7B, the screen 17 indicating an event being received may be displayed in a region of the touch screen 151, and outputting of at least a portion of information of the event may be limited in the screen 17.

Here, in a third drawing of FIG. 7B, preset authentication (for example, authentication using user's fingerprint information) may be performed by the user. In this case, on the basis of the performing of the preset authentication, the control unit 180 may switch the screen 17 to screen 17a displaying event information being received.

Also, when the user applies a different touch continuously in addition to the touch for the preset authentication, the function related to the event may be executed. That is, as illustrated in a fourth drawing of FIG. 7B, when the user's continuous touch is applied on the screen 17a, the control unit 180 may execute a function of connecting the received call.

In this case, together with the execution of the call connection function, the control unit 180 may release the payment mode. And then, the control unit 180 may control the touch screen 151 to output a screen corresponding to execution of the call connection function. Thus, as illustrated in a fifth drawing of FIG. 7B, an execution screen 19 according to execution of the call connection function may be output on the touch screen 151.

In this manner, even when a user's control command for executing the second function is received while the payment mode is being maintained, the control unit 180 may limit execution of the second function. Also, the second function may be executed only when preset authentication is performed, whereby only an authorized user may use the mobile terminal 100 in the payment mode state.

The mobile terminal 100 according to an exemplary embodiment of the present disclosure may perform wireless communication with a preset external device using the wireless communication unit 110. When the mobile terminal 100 enters the payment mode, the control unit 180 may transmit information regarding a state of the mobile terminal 100 to the preset external device while the payment mode is being maintained.

The information regarding the mobile terminal 100 may be information regarding execution of the first function in the mobile terminal 100 while the payment mode is being maintained. For example, in a case in which the payment function is executed by the payment unit, the control unit 180 may inform the preset external device that the payment function has been executed.

Also, the information regarding a state of the mobile terminal 100 may be information regarding a specific state of the mobile terminal 100. The specific state may be a state in which a control command for executing the second function is received by the mobile terminal 100 while the payment mode is being maintained. Also, the specific state may be a state in which it is sensed that relative positions of the mobile terminal 100 and the preset external device become away by a value equal to or greater than a preset ratio. When the specific state is sensed, the control unit 180 may control the wireless communication unit 110 to transmit information regarding the specific state to the preset external device.

Figure 8A:
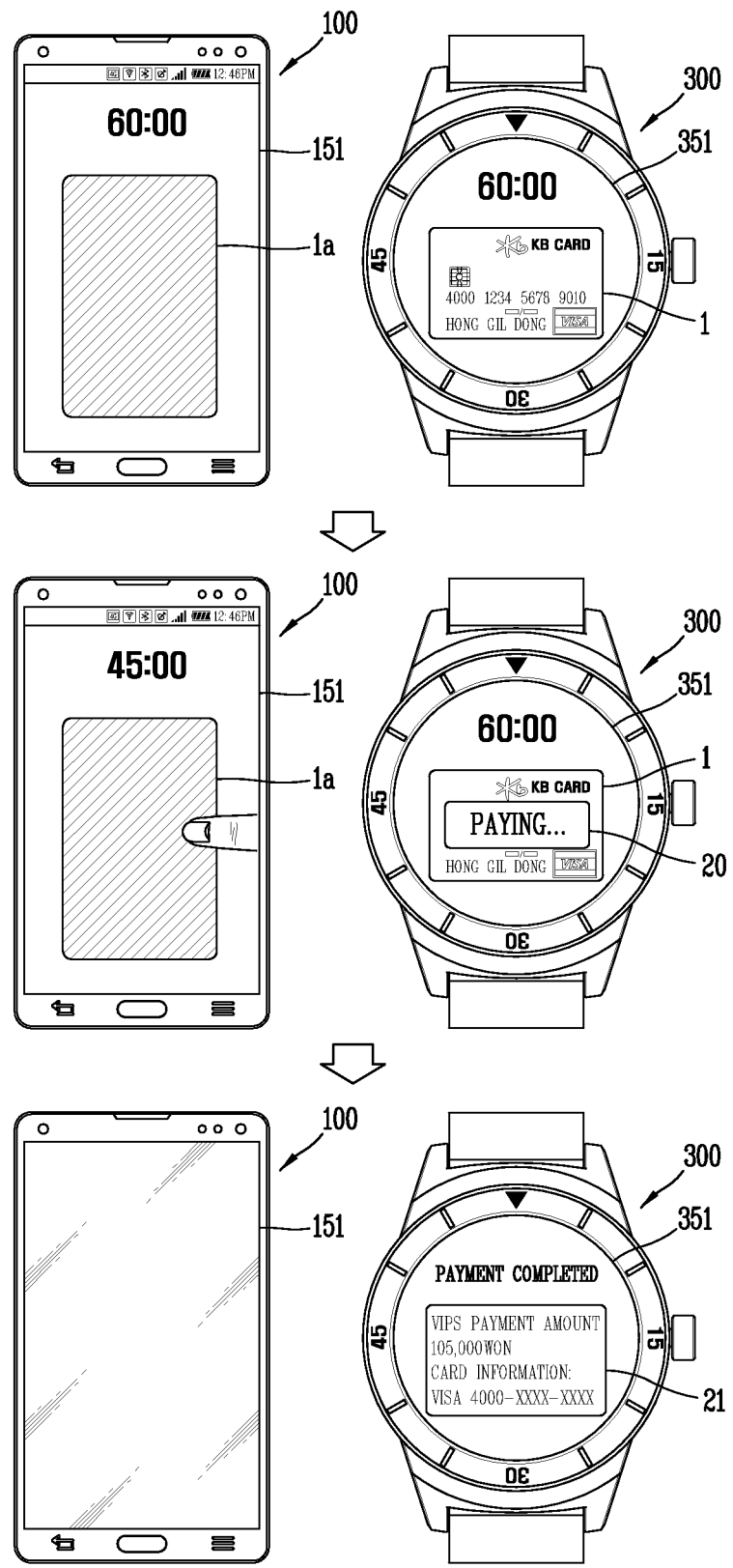
FIGS. 8A and 8B are views illustrating exemplary embodiments in which a state of the mobile terminal is informed to a preset external device, while a payment mode is being maintained.
Figure 8B:
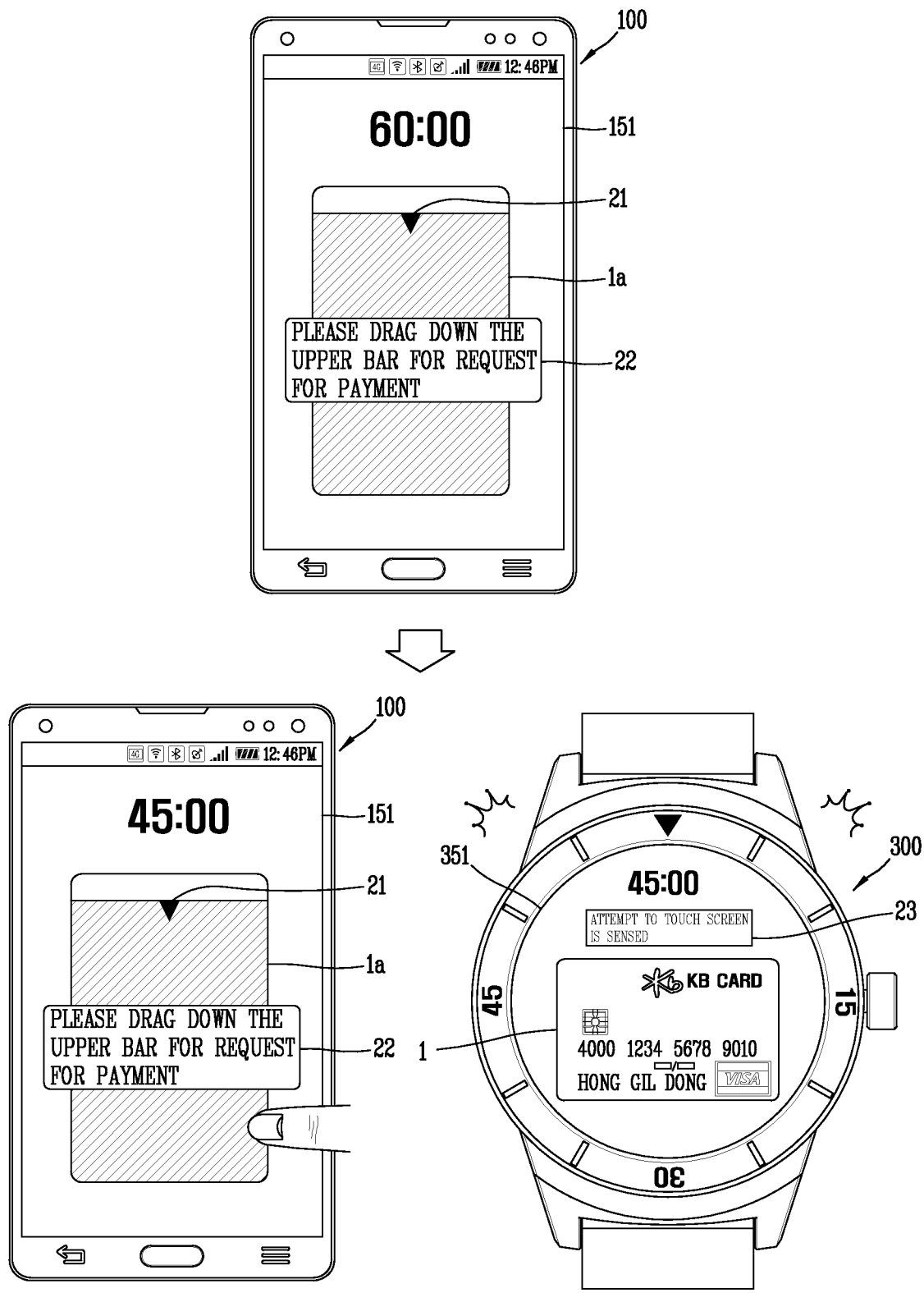

This will be described with reference to FIGS. 8A and 8B. FIGS. 8A and 8B are views illustrating exemplary embodiments in which a state of the mobile terminal is informed to a preset external device, while a payment mode is being maintained.

First, referring to FIG. 8A, when the mobile terminal 100 enters the payment mode, the control unit 180 may perform wireless communication with the preset external device 300. In this case, when the mobile terminal 100 enters the payment mode, a screen corresponding to the payment mode of the mobile terminal 100 may be output on a display unit 351 of the external device 300.

That is, as illustrated in a first drawing of FIG. 8A, a graphic object 1 corresponding to the payment unit may be output on the display unit 351 of the external device 300. Here, when the payment mode is entered, the control unit 180 may control the touch screen 151 to output a graphic object 1a limiting display of information regarding the payment unit. In contrast, since the external device 300 is occupied by the authorized user, information regarding the payment unit may be displayed in the graphic object 1.

Here, in a state in which the graphic object 1a is output, when a touch is applied to the touch screen 151, a payment function by the payment unit may be executed. In this case, the control unit 180 may control the wireless communication unit 110 to transmit information indicating execution of the payment function to the external device. Thus, as illustrated in a second drawing of FIG. 8A, information 20 indicating a state regarding execution of the first function in the mobile terminal 100 may be output on the display unit 351 of the external device 300.

When payment by the payment unit is completed, the control unit 180 may release the payment mode and switch the mobile terminal 100 to a locked state in which execution of both the first and second functions are limited. That is, as illustrated in a third drawing of FIG. 8A, the mobile terminal 100 may be switched to a locked state in which lighting of the touch screen 151 of the mobile terminal 100 is turned off.

Also, when the payment is completed, the control unit 180 may transmit result information according to the execution of the payment function to the external device 300. Thus, the result information 21 according to the execution of the payment function may be output on the display unit 351 of the external device 300.

In this manner, the user may check the information related to the function executed in the mobile terminal 100 from a position spaced apart from the mobile terminal 100.

Also, the user may check information regarding a specific state of the mobile terminal 100 in the payment mode. That is, referring to FIG. 8B, in a state in which the mobile terminal 100 has entered the payment mode, the control unit 180 may output guide information 22 guiding input of a control command for executing the first function on the touch screen. That is, on the basis of a touch (control command) applied to an upper bar 21 according to the guide information 22, the control unit 180 may execute the first function.

Here, as illustrated in a second drawing of FIG. 8B, when a touch is applied to a region other than the upper bar 21, the control unit 180 may determine the touch as a control command for executing the second function. Here, the control unit 180 may transmit information indicating the reception of the control command for executing the second function to the external device 300.

Thus, as illustrated in the second drawing of FIG. 8B, visual information 23 indicating access of someone else for executing the second function in the mobile terminal 100 may be displayed on the display unit 351 of the external device 300. Also, the control unit 180 may control the wireless communication unit 110 to output audile information or vibration indicating a specific state (the state in which the control command for executing the second function has been received) of the mobile terminal 100, on the external device 300.

Meanwhile, although not shown, the control unit 180 may recognize relative positions of the mobile terminal 100 and the external device 300. In detail, on the basis of strength of a wireless signal received from the external device 300, the control unit 180 may recognize a relative position of the mobile terminal 100 with respect to the external device 300.

When it is sensed that strength of the wireless signal received from the external device 300 is decreased by a value equal to or greater than a preset ratio, the control unit 180 may transmit notification information indicating a specific state of the mobile terminal to the external device 300. Here, the specific state may refer to a relative position of the mobile terminal 100 with respect to the external device 300.

Thus, the authorized user of the mobile terminal 100 may check a state of the mobile terminal 100 in a position spaced apart from the mobile terminal 100 by using the external device 300, in real time.

While the payment mode is being maintained in the mobile terminal 100, the control unit 180 may execute the first function on the basis of a control command for executing the first function.

The control command for executing the first function may be an input (for example, a touch or a push) directly applied to the mobile terminal 100. Also, the control command for executing the first function may be received through wireless communication with the preset external device. In this case, the control unit 180 may execute the first function on the basis of the control command received from the external device.

In a specific example, while the payment mode is being maintained, a procedure for authenticating the user may be required for the execution of the first function, or additional information (for example, signature information) may be required for the execution of the first function. In this case, the control unit 180 may request additional information required for execution of the first function from the external device, and when a control command is received from the external device in response to the request, the control unit 180 may execute the first function on the basis of the control command.

Hereinafter, an exemplary embodiment related thereto will be described with reference to FIGS. 9A and 9B.

Figure 9B:
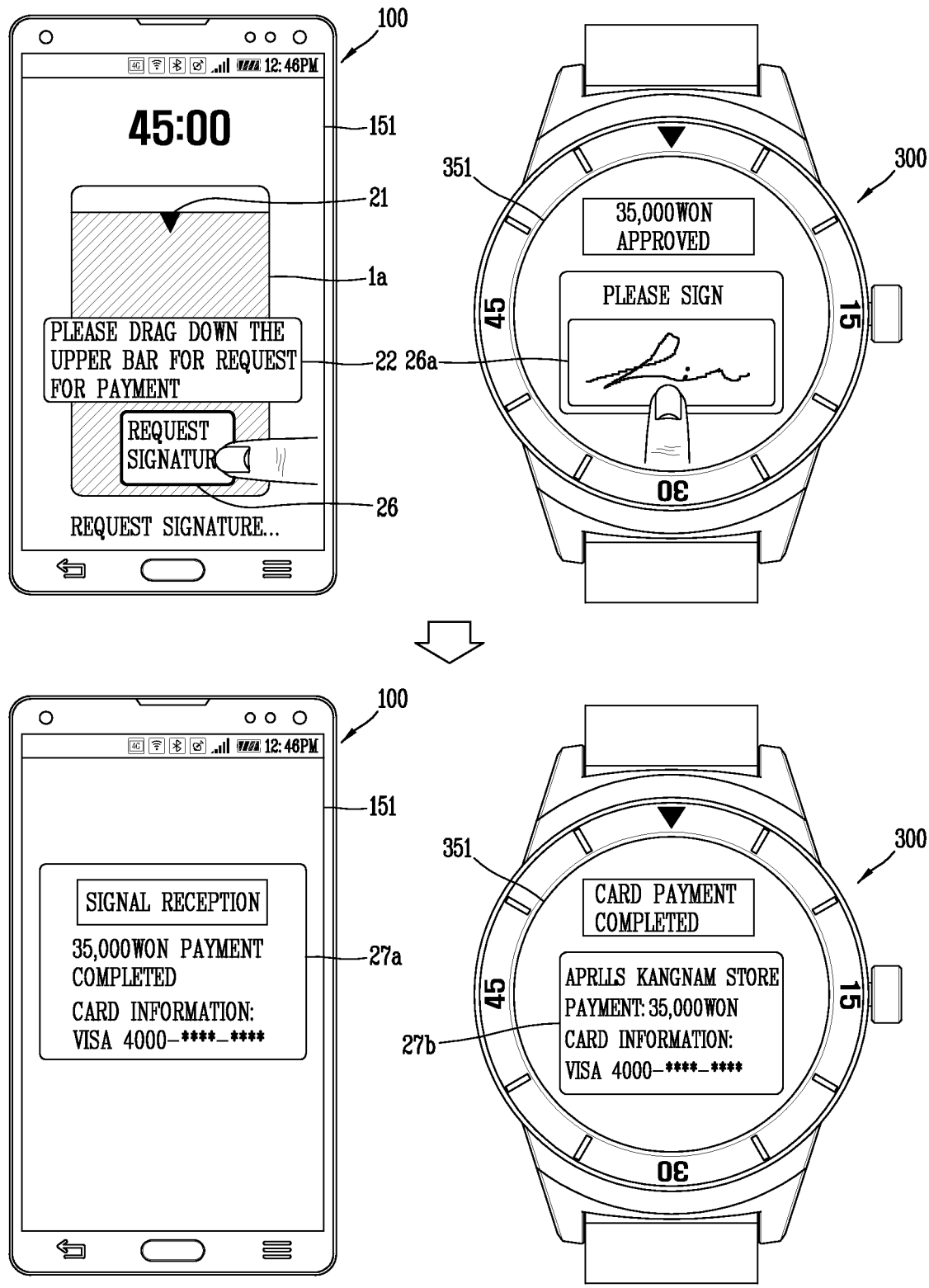

FIGS. 9A and 9B are views illustrating exemplary embodiments in which a first function is executed on the basis of a control command received from a preset external device.

First, referring to FIG. 9A, the graphic object 1a may be output on the touch screen 151, and as illustrated in a second drawing of FIG. 9A, an input window 21a of a control command for executing the first function may be output. Also, in the input window 21a, a control command for executing a function requiring additional user authentication, like replacement of the payment unit, may be input.

In this case, the control unit 180 may transmit a signal requesting replacement of the payment unit to the external device 300. On the basis of the signal, information 24 indicating that replacement of the payment unit is requested may be displayed on the display unit 351 of the external device 300, and a control command for replacing the payment unit may be input through the external device 300.

In this manner, when the control command input through the external device 300 is transmitted to the mobile terminal 100, the control unit 180 may execute a function replacing the payment unit on the basis of the control command received from the external device 300. Thus, as illustrated in a third drawing of FIG. 9A, a new graphic object 2 corresponding to the new payment unit may be output on the touch screen 151.

Also, the control unit 180 may request information required for execution of the first function from the external device.

That is, referring to FIG. 9B, the control unit 180 may display an input region 26 of a control command requesting a signature required for execution of the payment function by the payment unit, on the touch screen 151. When the control command requesting a signature is received, the control unit 180 may control the wireless communication unit 110 to transmit a signal requesting signature information of the user to the external device 300.

Upon receiving the signal, the external device 300 may output a region 26a for receiving signature information of the user, on the display unit 351. When signature information of the user is input through the display unit 351, the external device 300 may transmit the signature information to the mobile terminal 100.

The control unit 180 may execute the payment function on the basis of the signature information received from the external device 300, and subsequently output payment completion information 27a according to the execution of the payment function, on the touch screen 151. Also, as illustrated in a second drawing of FIG. 9B, after the payment completion information is transmitted to the external device 300, the payment completion information 27b may be output on the display unit 351.

Thus, in the payment mode, in a case in which additional information or authentication of the user is required for executing the function related to payment, even though the user is in a positioned spaced apart from the mobile terminal 100, the payment related function may be easily executed using the external device 300. That is, even in a case in which separate authentication is required for executing the payment related function, the user may conveniently transmit a control command including information required for executing the payment related function by using the external device.

The payment mode may be released according to various methods. For example, in a case in which a payment completion or payment failure event occurs according to execution of the payment function by a payment unit, the payment mode may be released. Also, the payment mode may be released as preset user authentication is performed. This will be described with reference to FIGS. 10A and 10B hereinafter.

Figure 10A:
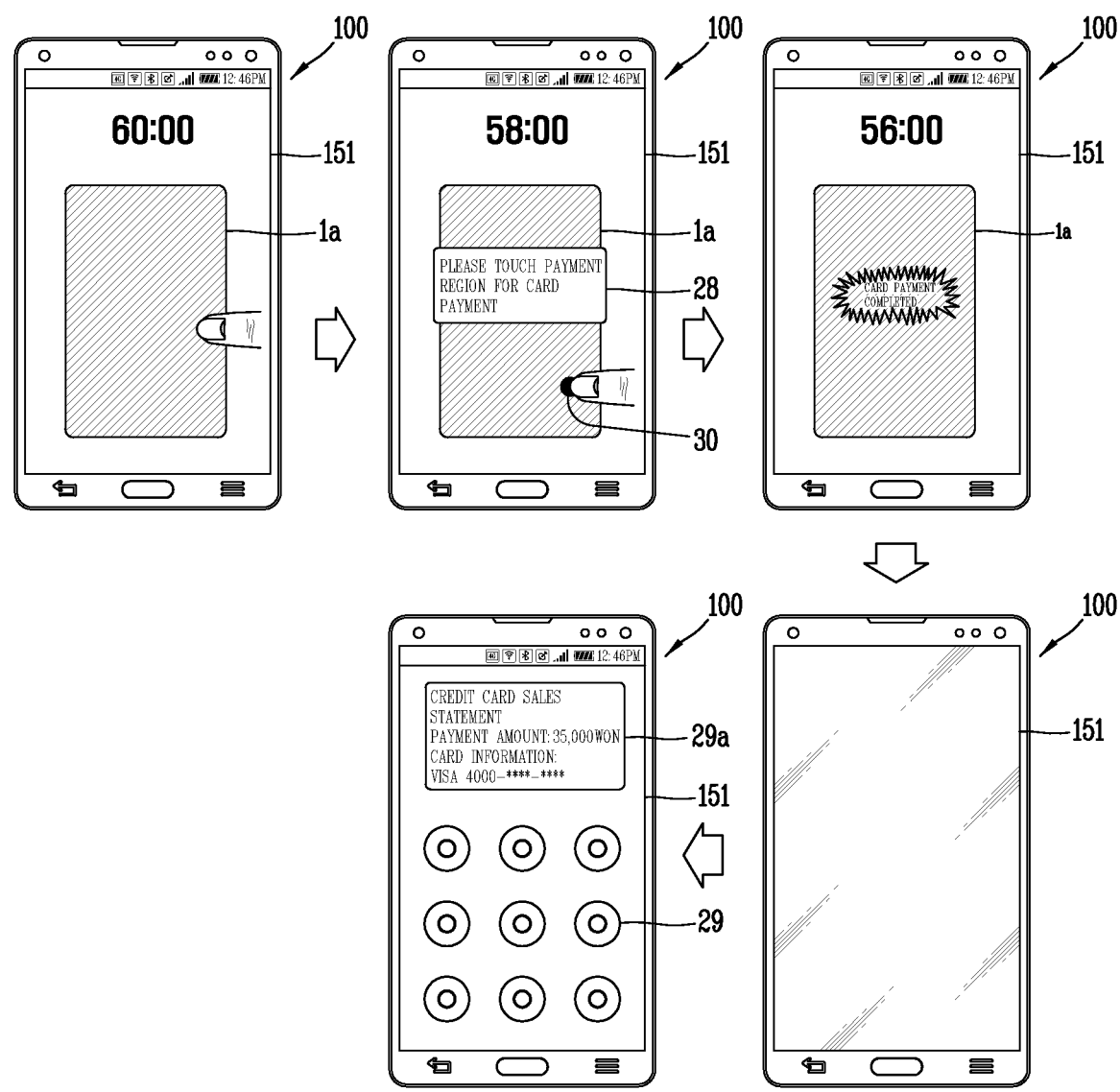
FIGS. 10A and 10B are views illustrating exemplary embodiments related to releasing a payment mode.
Figure 10B:
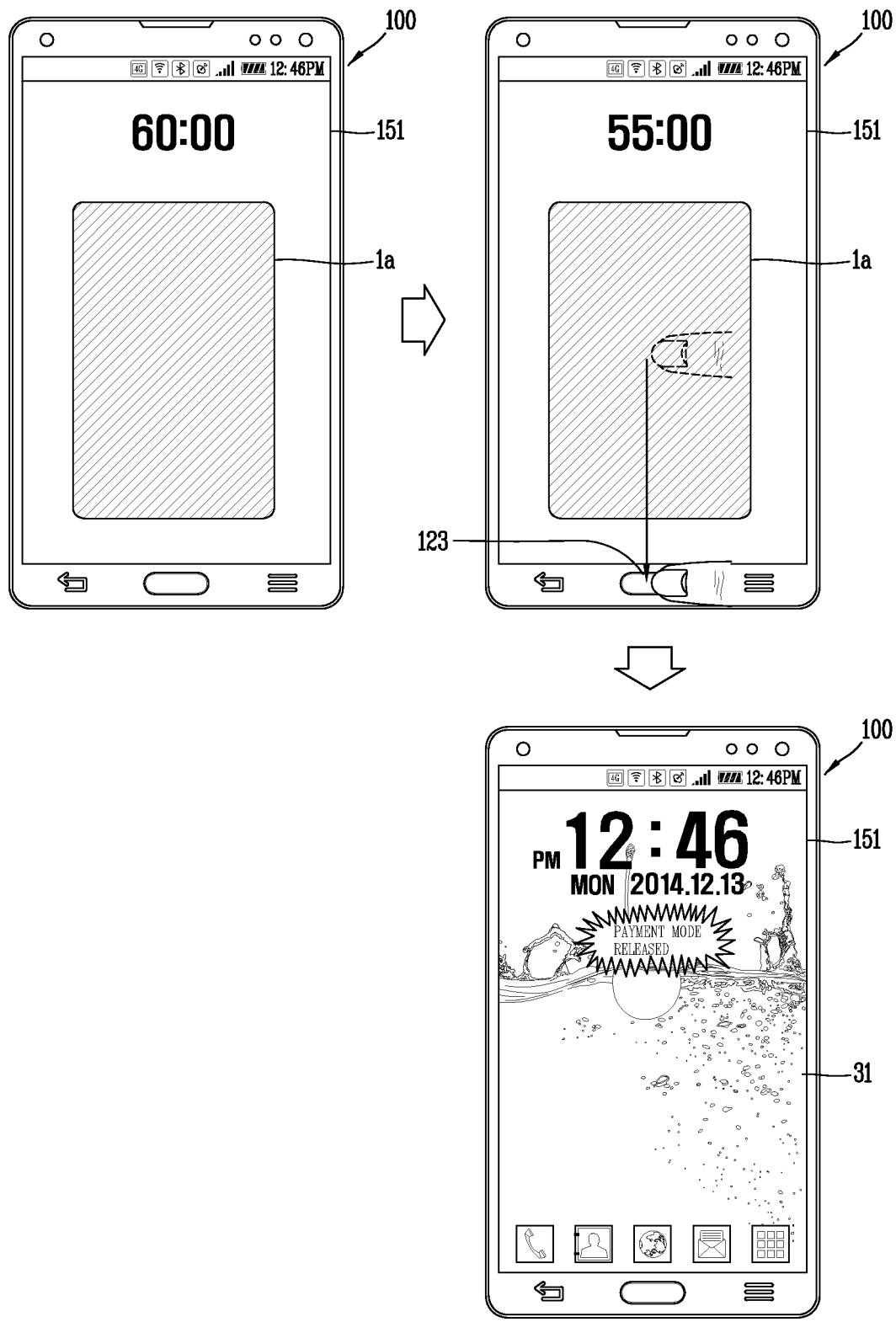

FIGS. 10A and 10B are views illustrating exemplary embodiments related to releasing a payment mode.

First, referring to FIG. 10A, the payment mode may be entered and a graphic object 1a corresponding to a payment unit may be output on the touch screen 151. When a touch is applied to the graphic object 1a, the control unit 180 may display an activation region 30 on the touch screen as illustrated in a second drawing of FIG. 10A.

In a state in which the activation region 30 is displayed, when a touch is applied to the activation region 30, the control unit 180 may execute a payment function by a payment unit. That is, on the basis of a touch applied to the activation region 30, the control unit 180 may control the wireless communication unit 110 to transmit a wireless signal including information regarding the payment unit to a settlement terminal. In this case, the mobile terminal 100 may transmit the wireless signal on the basis of the application of the touch, whereby power consumption may be reduced compared with a case in which near-field communication is continuously performed.

In this manner, when the information regarding the payment unit is transmitted to the settlement terminal and payment of a specific amount of money is made in the settlement terminal on the basis of the information regarding the payment unit, payment completion information may be received through the wireless communication unit 110. The control unit 180 may output payment completion information to the touch screen 151 as illustrated in a third drawing of FIG. 10a.

In this manner, when an event of payment completion occurs, the control unit 180 may release the payment mode and enters a state in which execution of both the first and second functions is limited. That is, the control unit 180 releases the payment mode, turns off lighting of the touch screen 151, and switches to a locked state as illustrated in a fourth drawing of FIG. 10A. Here, the locked state may be a state in which execution of an application is limited on the basis of a control command from the user.

Thereafter, when an input for turning on lighting of the touch screen 151 is applied. The control unit 180 may output a screen 29 representing a locked state on the touch screen 151 as illustrated in a fifth drawing of FIG. 10A. Also, the control unit 180 may output payment completion information 29a according to execution of the payment function on a region of the touch screen 151.

Although not shown, in a case in which payment by the payment unit has failed, for example, in a case in which payment completion information is not received within a preset period of time after information regarding the payment unit is transmitted to the settlement terminal, the control unit 180 may release the payment mode. In another example, in a case in which a specific period of time in which the payment mode is maintained has lapsed, or in a case in which a control command for executing the second function is input a preset number of times or greater, while the payment mode is maintained, the control unit 180 may release the payment mode.

When the payment mode is released, the control unit 180 may switch the mobile terminal 100 to a locked state such that someone else other than the authorized user cannot use the mobile terminal 100.

Meanwhile, referring to FIG. 10B, in a state in which the graphic object 1a corresponding to the payment unit is output on the touch screen 151, a drag touch may be applied from the graphic object 1a to the user input unit 123 as illustrated in a second drawing of FIG. 10B. Here, the user input unit 123 may receive user's fingerprint information.

When the user's fingerprint information input through the user input unit 123 is identical to preset authentication information, the control unit 180 may release the payment mode. In this case, the control unit 180 may switch the mobile terminal 100 to a state in which various functions may be executed on the basis of a control command.

For example, when the payment mode is released, the control unit 180 may output a home screen page 31 on the touch screen 151 as illustrated in a third drawing of FIG. 10B. Also, the control unit 180 may output information indicating release of the payment mode in a region of the touch screen 151.

In this manner, when the payment mode is released on the basis of user authentication, since the mobile terminal is occupied by the authorized user in most cases, and thus, the mobile terminal may be switched to a state in which the mobile terminal may be used.

According to the exemplary embodiment of the present disclosure, while the payment mode in which payment may be performed by a payment unit is maintained, only the function related to the payment is executed, and thus, even though someone else other than the user occupies the mobile terminal, he or she cannot execute other functions or check information using the mobile terminal.

Also, after the function related to payment is executed, when the payment mode is released, access to the mobile terminal is limited until specific authentication by the user is performed, and thus, user privacy and personal information may be protected.

Meanwhile, in the mobile terminal according to an embodiment of the present disclosure, as discussed above, in addition to limiting a function unrelated to payment when payment is performed, an additional security function may be provided to prevent various accidents that may occur when payment is made, for example, an error of a purchase usage, or an error in a payment amount by strengthening security regarding payment information.

For example, the mobile terminal according to an embodiment of the present disclosure may receive payment information including at least one of a payment location, payment contents, and a payment amount from a settlement terminal through communication with the settlement terminal before substantial payment information (for example, information regarding a payment unit (credit card information) for payment of an amount is provided to the settlement terminal. In a case in which such information is received, the control unit 180 may output the received information on the touch screen 151, and when the received information is approved by the user, the control unit 180 may control the wireless communication unit 110 to perform substantial payment with the settlement terminal.

Here, the received information may be approved by the user in various manners. For example, when a payment unit is selected and a payment mode is activated as illustrated in the first drawing of FIG. 11A, payment information 1110 received from the settlement terminal may be displayed together with information regarding the payment unit in a region of the touch screen 151 as illustrated in the second drawing of FIG. 11A. A graphic object 1120 for obtaining "approval' on the received payment information from the user may be output on the touch screen 151. When a preset type of touch is applied to the graphic object 1120, the controller 180 may determine that user has approved the payment information. In order to cause the user to recognize that approval has been successfully completed, the control unit may output a graphic object 1130 indicating completion of approval as illustrated in the third drawing of FIG. 11A. The graphic object may have a shape of a lock, and before the payment information is approved, the control unit 180 may output a graphic object having a shape in which the lock is not locked, and after payment information is approved, the control unit 180 may output a graphic object having a shape in which the lock is locked. Accordingly, the user may recognize whether the payment information has been normally approved by intuition.

Meanwhile, when the payment information is approved, it may be expressed that "payment information is locked".

Meanwhile, the touch screen ma include a fingerprint recognition sensor, and the controller 180 may compare a fingerprint of a finger which has applied a touch to the graphic object 1120 with a fingerprint of a registered user, and in a case in which the fingerprint of the finger which has applied a touch to the graphic object 1120 matches the fingerprint of the previously registered user according to the comparison result, the control unit 180 may determine that the payment information is approved. Meanwhile, in a case in which the fingerprint of the finger which has applied the touch to the graphic object 1120 does not match the fingerprint of the previously registered user according to the comparison result, the control unit 180 may determine that the payment information is not approved, and may terminate the payment mode. In this case, the control unit 180 may request payment information from the settlement terminal again. The re-request for the payment information may be made on the basis of a user selection. That is, the control unit 180 may cause the user to select whether to re-request payment information by using a pop-up window, or the like.

Meanwhile, when the payment information is approved, as discussed above in the previous embodiments, payment may be made on the approved amount through communication with the settlement terminal on the basis of a user request or completion of the approval. Here, user authentication has already been performed when the payment unit is selected.

Figure 11A:
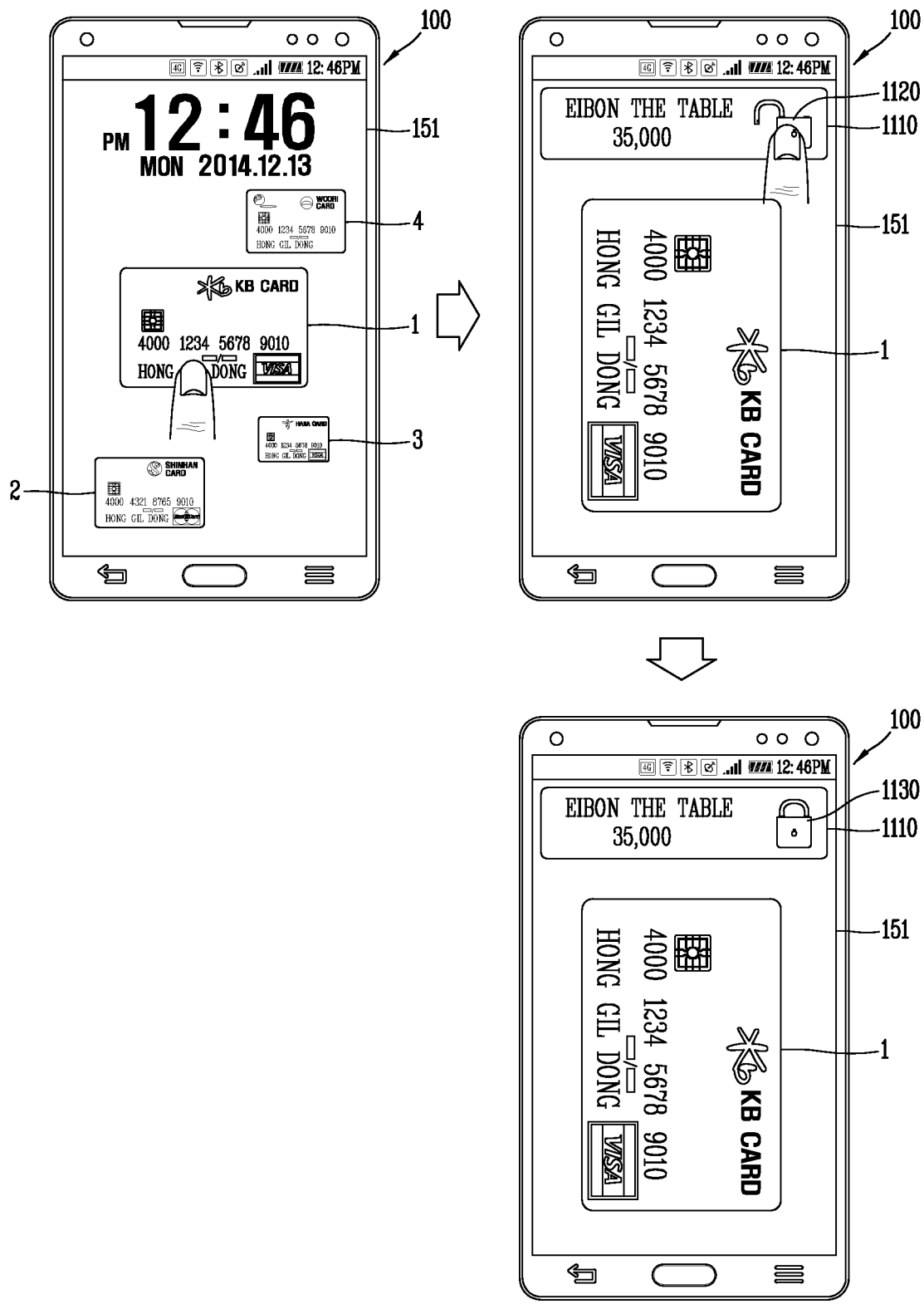
FIGS. 11A and 11B are views illustrating exemplary embodiments related to providing a method avoiding an error related to a payment.

Meanwhile, as illustrated in the third drawing of FIG. 11A, user authentication may be performed after the approval is completed. That is, as illustrated in the third drawing of FIG. 11A, user authentication information may be received from the user after the approval is completed on the payment information. In this case, the control unit 180 may perform payment with the settlement terminal on the basis of user authentication information input from the user.

Also, in another example, the payment information may be approved together with user authentication process for entering the payment mode. For example, when a graphic object 1 corresponding to a payment unit is selected as illustrated in the first drawing of FIG. 11B, the control unit 180 may receive payment information from the settlement terminal as illustrated in the second drawing of FIG. 11B. The payment information may be output on the touch screen 151 as illustrated. In a state in which the payment information and the payment unit are output, when user authentication information (for example, fingerprint information) is input and the user authentication information matches previously registered user authentication information, the control unit 180 may determine that the payment information has been approved and, in addition, determine that payment using the payment unit has been approved.

Figure 11B:
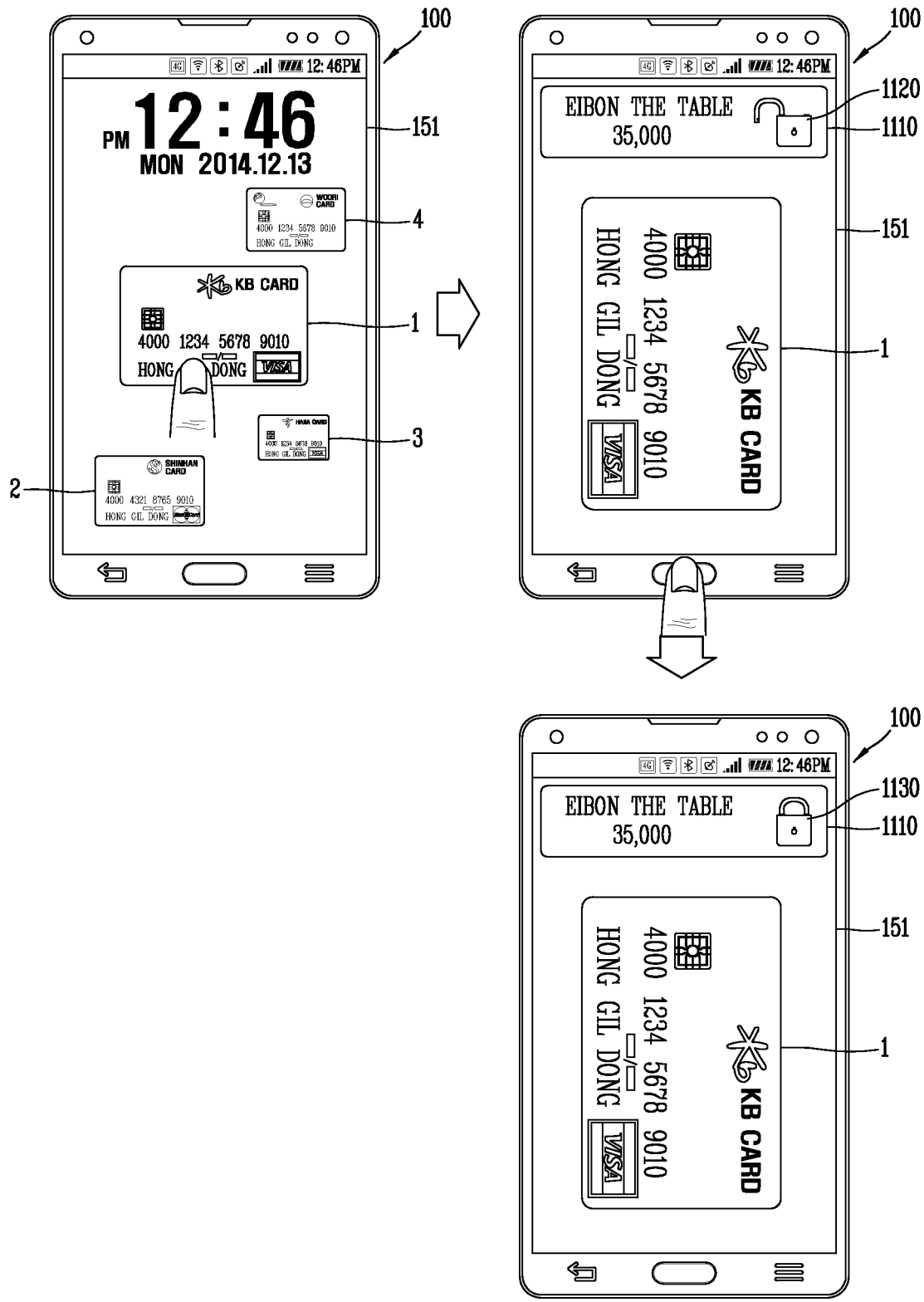

Meanwhile, as illustrated in FIGS. 11A and 11B, in a state in which the payment information has been approved, when payment is substantially made with the settlement terminal, if the payment information with the settlement terminal and the approved payment information do not match, payment may not be made.

That is, when the approved payment information does not match the payment information with the settlement terminal, the control unit 180 may transmit payment rejection information to at least one of the settlement terminal and a settlement server. In this case, the settlement terminal may stop payment. Also, the settlement server may transmit approval rejection information to the settlement terminal on the basis of the payment rejection information.

Meanwhile, in a case in which the approved payment information and the payment information with the settlement terminal do not match, the control unit 180 may cause the user to select whether to reject approval, rather than immediately making an approval rejection request. In this case, when the user selects to continue to make payment even though the payment information does not match, the control unit 180 may transmit information for requesting making payment to the settlement terminal or the settlement server according to the user selection.

Meanwhile, the payment information described above with reference to FIGS. 11A and 11B may be received from the settlement terminal on the basis of a user request. Such a user request may be made by applying a preset type of touch to a preset region on the touch screen 151. For example, when a drag touch is applied to a region of the touch screen 151, the control unit 180 may process the drag touch as a payment information transmission request command from the settlement terminal. The control unit 180 may request payment information transmission from the settlement terminal on the basis of the transmission request command.

Meanwhile, a graphic object as a target to which the drag touch is to be applied may be output on the touch screen, and in a case in which the drag touch is applied to the graphic object, the control unit 180 may transmit a payment information transmission request to the settlement terminal or the settlement server.

Meanwhile, the control unit 180 may transmit the payment information transmission request with respect to the settlement terminal to the settlement server, and the settlement server may receive payment information from the settlement terminal and transmit the received payment information to the mobile terminal. In this case, the settlement terminal may not perform direct communication regarding the payment information with the mobile terminal.

In addition, the settlement terminal transmitting payment information may be determined in various manners. At least one of the settlement terminal, the mobile terminal, and the settlement server may transmit payment information in the settlement terminal present in an area where the mobile terminal is located, to the mobile terminal by utilizing location-based information.

In another example, payment information may be generated by the mobile terminal, as well as being received from the settlement terminal or the settlement server.

For example, the mobile terminal may receive payment information from the user on the basis of a user request.

Such payment information (which includes at least one of a payment location, payment contents, and a payment amount) may be specified by the user. That is, the user may set payment information by utilizing a GUI provided in the mobile terminal. The control unit 180 may transmit the set payment information to the payment server on the basis of a user request.

In this case, the mobile terminal may transmit information regarding a payment unit (for example, a specific credit card) or identification information of the payment unit to the settlement server.

The mobile terminal may perform payment with the settlement terminal through any one of the methods according to the previous embodiments described above.

In order to obtain payment approval from the settlement server, the settlement terminal may transmit information regarding a payment unit transmitted from the mobile terminal to the settlement server. The information transmitted from the settlement terminal to the settlement server may include a payment location, a payment amount, and identification information regarding payment unit.

The payment server compares the payment information transmitted from the settlement terminal and payment information received from the mobile terminal, and when the pieces of payment information received from both sides do not match, the settlement server may transmit approval rejection information to the settlement terminal.

Meanwhile, in this case, the settlement server may also transmit the approval rejection information to the mobile terminal. When an approval request is transmitted from the mobile terminal to the settlement server, the settlement server may approve payment regarding the settlement terminal even though the pieces of payment information do not match.

As described above, since the mobile terminal according to the present disclosure approves payment information, an error that may occur as an amount is paid on the basis of payment information set in the settlement terminal may be prevented.

The present disclosure described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present disclosure should be determined by reasonable interpretations of the attached claims and every modification within the equivalent range are included in the scope of the present disclosure.

The foregoing exemplary embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described exemplary embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be is embraced by the appended claims.

What is claimed is:

1. A mobile terminal comprising:
a wireless communication unit configured to perform wireless communication with a settlement terminal;
a display comprising a touch screen; and
a controller configured to:
cause the display to display a graphic object corresponding to a payment unit;
enter a payment mode in which a pending payment is available to be paid by the payment unit when user authentication information received with respect to the payment unit matches preset authentication information;

execute a first function related to payment by the payment unit during the payment mode;

limit execution of a second function that is not related to payment in response to a request to execute the second function received while the payment mode is being maintained, wherein the request to execute the second function comprises a touch received in a display area other than an area of the display in which the graphic object is displayed, and the second function is a function specified by user setting among functions executable in the mobile terminal;

cause the wireless communication unit to perform wireless communication with a preset external device wearable on a body part;

cause the wireless communication unit to transmit notification information indicating a specific state of the mobile terminal to the preset external device when the payment mode is entered;

cause the wireless communication unit to transmit a signal requesting signature information or the user authentication information necessary for executing the first function to the preset external device in the payment mode; and execute the first function in response to the signature information or the user authentication information received from the external device in response to the signal.

2. The mobile terminal of claim 1, wherein:
the payment mode is maintained for a set period of time such that the payment mode expires when the set period of time lapses; and
the first function cannot be executed after the expiration of the payment mode.

3. The mobile terminal of claim 2, wherein the controller is further configured to enter the payment mode in response to or following a touch input applied to the touch screen for setting the period of time, the touch input applied after it is determined that the user authentication information matches the preset authentication information.

4. The mobile terminal of claim 3, wherein the period of time is set based on at least one of a length of the touch input on the touch screen, a direction of the touch input, or a duration of the touch input.

5. The mobile terminal of claim 2, wherein:
the first function includes a function of payment by the payment unit corresponding to the graphic object; and
the controller is further configured to cause the wireless communication unit to transmit a wireless signal including information regarding the payment unit to the settlement terminal when the function of payment by the payment unit is executed.

6. The mobile terminal of claim 5, wherein the controller is further configured to:
cause the display to display an activation region in at least a portion of the touch screen when the payment mode is entered; and
cause the wireless communication unit to transmit the wireless signal to the settlement terminal in response a touch input applied to the activation region.

7. The mobile terminal of claim 5, wherein the controller is further configured to cause the wireless communication unit to receive information regarding completion of the payment by the payment unit when the execution of the first function is completed such that further execution of at least the first function or the second function is limited after the payment is completed even before the set period of time lapses.

8. The mobile terminal of claim 2, wherein:
the first function includes a function of maintaining the payment mode; and
the controller is further configured to maintain the payment mode even after the set period of time lapses when at least one of an event for switching the payment unit corresponding to the graphic object or an event for extending the set period of time occurs before the set period of time lapses.

9. The mobile terminal of claim 8, wherein the event for switching the payment unit occurs when information regarding completion of payment by the payment unit is not received by the wireless communication unit within a preset period of time after the function of payment by the payment unit corresponding to the graphic object is executed.

10. The mobile terminal of claim 8, wherein when the event for switching the payment unit corresponding to the graphic object occurs, the controller is further configured to:
switch the graphic object to a new graphic object corresponding to a new payment unit;
cause the display to display the new graphic object; and
reset a period of time starting from a point in time at which the new graphic object is displayed on the touch screen.

11. The mobile terminal of claim 1, wherein the controller is further configured to:
determine a first touch, which is received at a predetermined area of the graphic object during the payment mode, as a request to execute the first function; and
determine a second touch, which is received at an area other than the predetermined area of the graphic object during the payment mode, as a request to execute the second function.

12. The mobile terminal of claim 1, wherein the controller is further configured to:
sense that strength of a wireless signal received from the preset external device is decreased by a value that is equal to or greater than a preset ratio based on the wireless communication with the preset external device; and
cause the wireless communication unit to transmit notification information indicating a relative position of the mobile terminal with respect to the preset external device to the preset external device.

13. The mobile terminal of claim 11, wherein in response to the second touch, the controller is further configured to cause the wireless communication unit to transmit, to the preset external device, notification information indicating that the second touch has been received.

14. The mobile terminal of claim 1, wherein the controller is further configured to:
execute the first function in response to a control command related to payment by the payment unit, the control command received from the preset external device via the wireless communication unit.

15. The mobile terminal of claim 1, wherein the controller is further configured to execute the second function when preset authentication is performed by a user during the payment mode.

16. The mobile terminal of claim 15, wherein the controller is further configured to end the payment mode when the second function is executed.

17. A method for controlling a mobile terminal, the method comprising:
performing wireless communication with a settlement terminal;

displaying a graphic object corresponding to a payment unit on a touch screen;

entering a payment mode in which a pending payment is available to be paid by the payment unit when user authentication information received with respect to the payment unit matches preset authentication information;

limiting execution of a second function that is not related to payment in response to a request to execute the second function received while the payment mode is being maintained, wherein the request to execute the second function comprises a touch received in a display area other than an area of the touch screen in which the graphic object is displayed, and the second function is a function specified by user setting among functions executable in the mobile terminal;

performing wireless communication with a preset external device wearable on a body part;

transmitting notification information indicating a specific state of the mobile terminal to the preset external device when the payment mode is entered;

transmitting a signal requesting signature information or the user authentication information necessary for executing a first function related to payment by the payment unit to the preset external device in the payment mode; and executing the first function in response to the signature information or the user authentication information received from the external device in response to the signal.

18. The method of claim 17, wherein:

the payment mode is maintained for a set period of time such that the payment mode expires when the set period of time lapses; and the first function cannot be executed after the expiration of the payment mode.

19. The method of claim 17, wherein:

the first function includes a function of payment by the payment unit corresponding to the graphic object; and the method further comprises transmitting a wireless signal including information regarding the payment unit to the settlement terminal when the function of payment by the payment unit is executed.

20. The method of claim 17, further comprising executing the second function when preset authentication is performed by a user during the payment mode.

* * * * *